United States Patent [19]
Cameron et al.

[11] Patent Number: 5,805,464
[45] Date of Patent: Sep. 8, 1998

[54] DYNAMIC BALANCER ELECTRONIC ANGLE FINDER

[75] Inventors: Wayne B. Cameron, Tonawanda; Roger J. Morella, Jr., East Aurora; Aaron C. Clarke, Lockport; Daniel J. Pilsbury, N. Tonawanda, all of N.Y.

[73] Assignee: Dynamics Research Corp., Tonwanda, N.Y.

[21] Appl. No.: 490,751

[22] Filed: Jun. 15, 1995

[51] Int. Cl.[6] .................................................. G01M 1/38
[52] U.S. Cl. ............................................. 364/508; 73/462
[58] Field of Search ................... 364/508, 550, 364/423.098, 424.034, 463; 74/573 R; 73/66, 457, 460, 462, 468

[56] References Cited

U.S. PATENT DOCUMENTS

| | | | |
|---|---|---|---|
| 4,064,704 | 12/1977 | Blackburn | 364/508 |
| 4,262,536 | 4/1981 | Orem et al. | 364/508 |
| 4,357,832 | 11/1982 | Blackburn et al. | 364/508 |
| 4,450,529 | 5/1984 | Hill et al. | 364/508 |
| 4,457,172 | 7/1984 | Mathes et al. | 364/508 |
| 4,475,393 | 10/1984 | Reutlinger | 73/462 |
| 4,480,471 | 11/1984 | Kögler | 73/462 |
| 4,489,607 | 12/1984 | Park | 73/462 |
| 4,535,411 | 8/1985 | Blackburn et al. | 364/508 |
| 4,626,147 | 12/1986 | Nystuen et al. | 409/133 |
| 4,868,762 | 9/1989 | Grim et al. | 364/508 |
| 4,958,290 | 9/1990 | Kendall et al. | 364/463 |
| 5,001,408 | 3/1991 | Kyogoku et al. | 73/462 |
| 5,089,969 | 2/1992 | Bradshaw et al. | 364/508 |
| 5,172,596 | 12/1992 | Rothamel et al. | 364/508 |
| 5,209,116 | 5/1993 | Okumura | 73/462 |
| 5,329,814 | 7/1994 | Betz et al. | 73/462 |
| 5,343,408 | 8/1994 | Chen et al. | 364/508 |
| 5,355,729 | 10/1994 | Douglas | 73/468 |
| 5,412,583 | 5/1995 | Cameron et al. | 364/508 |

OTHER PUBLICATIONS

Schenck Trebel Publication "Fundamentals of Balancing", Apr. 1990.

*Primary Examiner*—Ellis B. Ramirez
*Assistant Examiner*—Eric W. Stamber
*Attorney, Agent, or Firm*—Bean, Kauffman & Snyder

[57] ABSTRACT

An apparatus for determining the placement of mass adjustment on a work piece by a centrifugal balancer includes a device incremented by pulses representing angular displacement of the work piece derived from a device responsive to system drive motor rotation and the drive motor-to-work piece rotation ratio for providing the angular position of the work piece relative to a reference point on the work piece.

20 Claims, 24 Drawing Sheets

```
┌─────────────────────────────────────────────────┐
│ COMPUTER BALANCING - Dynamics Research Corp.    │
│        Current Setup: none                      │
├─────────────────────────────────────────────────┤
│  ─────────── SINGLE PLANE BALANCE ───────────   │
│                Half Key Setup                   │
│                                                 │
│   Change half key weights (Y/N)?   No           │
│                                                 │
│    Near key length : 0         inches           │
│    Near key width  : 0         inches           │
│                                                 │
│   Near key weight is  0        gm               │
│                                                 │
│    Far key length  : 0         inches           │
│    Far key width   : 0         inches           │
│                                                 │
│   Far key weight is   0        gm               │
│                                                 │
│       Press [enter] to accept half key weights  │
│            Press [Y] to changeweights           │
└─────────────────────────────────────────────────┘
```

Fig. 6B

```
┌─────────────────────────────────────────────────┐
│ COMPUTER BALANCING - Dynamics Research Corp.    │
│        Current Setup: none                      │
├─────────────────────────────────────────────────┤
│  ─────────── SINGLE PLANE BALANCE ───────────   │
│        ┌──────────────────────────────┐         │
│        │     AVAILABLE STANDARDS      │         │
│        │                              │         │
│        │  1)  ISO-1940 G 6..3         │         │
│        │  2)  ISO-1940 G 2.5          │         │
│        │  3)  ISO-1940 G ___          │         │
│        │  4)  NEMA MG1-12.06          │         │
│        │  5)  MIL-STD-167-1           │         │
│        │  6)  API                     │         │
│        │  7)  TEN PERCENT RULE        │         │
│        │                              │         │
│        │  Select a Balance Standard   │         │
│        └──────────────────────────────┘         │
│   NEMA 1-12.06 maximum displacement:   2 mils   │
│              Is This Correct (Y/N)?             │
└─────────────────────────────────────────────────┘
```

Fig. 6C

```
COMPUTER BALANCING — Dynamics Research Copr.
         Current Profile: none
```

```
─────────── TWO PLANE BALANCE ───────────
                    Setup
Rotor Weight:   50        Balancing Speed:    600
                          Max. Operating Speed:  1700
Calibration Radius:
     Near Side:  14.3      Far Side:    8.2
Correction Radius:
     Near Side:  13.5      Far Side:    7.4

Radius Units (In. or Cm.): inches

Correction Weight Units (O/G/D): drill depth
Drill Weight Units (O/G): ounces
Depth Units (In. or Cm.): centimeters
Weight/Depth Ratio (ounces per cm.):   2
```
Is This Correct (Y/N) ?

Fig. 7

```
COMPUTER BALANCING — Dynamics Research Copr.
         Current Profile: none
```

```
─────────── FORCE BALANCE ───────────
                    Setup
Rotor Weight:   50        Balancing Speed:    600
                          Max. Operating Speed:  1700
Calibration Radius:   14.3

Correction Radius    13.5

Radius Units (In. or Cm.): inches

Correction Weight Units (O/G/D): drill depth
Drill Weight Units (O/G): ounces
Depth Units (In. or Cm.): centimeters
Weight/Depth Ratio (ounces per cm.):   2
```
Is This Correct (Y/N) ?

Fig. 8

```
┌────────────────────────────────────────────────────┐
│ ┌────────────────────────────────────────────────┐ │
│ │ COMPUTER BALANCING — Dynamics Research Corp.   │ │
│ │ Current Profile: none                          │ │
│ └────────────────────────────────────────────────┘ │
│ ┌─ SINGLE PLANE BALANCE — NEAR SIDE SENSOR ──────┐ │
│ │            Calibration Setup                   │ │
│ │    ┌══ SUGGESTED CALIBRATION WEIGHT ═══┐       │ │
│ │    │ Add a weight of 1.33 ounces (37.7 grams)  │ │
│ │    │ to the near side of the rotor at approximately │
│ │    │ 319 degrees at a radius of 4.3 inches     │ │
│ │    └───────────────────────────────────┘       │ │
│ │                                                │ │
│ │   Calibration Weight:   1.33                   │ │
│ │                                                │ │
│ │         ┌─────────────────────────────┐        │ │
│ │         │ Rotor Angle is 271 Degrees  │        │ │
│ │         └─────────────────────────────┘        │ │
│ └────────────────────────────────────────────────┘ │
│ Enter the actual calibration weight added to the rotor. │
└────────────────────────────────────────────────────┘
```

Fig. 14

```
┌────────────────────────────────────────────────────┐
│ ┌────────────────────────────────────────────────┐ │
│ │ COMPUTER BALANCING — Dynamics Research Corp.   │ │
│ │ Current Profile: none                          │ │
│ └────────────────────────────────────────────────┘ │
│ ┌─ SINGLE PLANE BALANCE — NEAR SIDE SENSOR ──────┐ │
│ │            Calibration Setup                   │ │
│ │    ┌══ SUGGESTED CALIBRATION WEIGHT ═══┐       │ │
│ │    │ Add a weight of 1.33 ounces (37.7 grams)  │ │
│ │    │ to the near side of the rotor at approximately │
│ │    │ 319 degrees at a radius of 4.3 inches     │ │
│ │    └───────────────────────────────────┘       │ │
│ │                                                │ │
│ │   Calibration Weight:        1.33              │ │
│ │   Calibration Weight Angle:   319              │ │
│ │                                                │ │
│ │         ┌─────────────────────────────┐        │ │
│ │         │ Rotor Angle is 271 Degrees  │        │ │
│ │         └─────────────────────────────┘        │ │
│ └────────────────────────────────────────────────┘ │
│ Enter the actual calibration weight added to the rotor. │
└────────────────────────────────────────────────────┘
```

Fig. 15

```
┌─────────────────────────────────────────────────────┐
│  COMPUTER BALANCING — Dynamics Research Corp.       │
│  Current Profile: none                              │
├─────────────────────────────────────────────────────┤
│  ─ SINGLE PLANE BALANCE — NEAR SIDE SENSOR ─        │
│              Calibration Readings                   │
│                                                     │
│      Remove Calibration Weight From Near Side       │
│                                                     │
│                        and                          │
│                                                     │
│                Hit Any Key When Ready               │
│                                                     │
│                                                     │
│           ┌───────────────────────────┐             │
│           │  Rotor Angle is 75 Degrees│             │
│           └───────────────────────────┘             │
└─────────────────────────────────────────────────────┘
```

Fig. 21

```
┌─────────────────────────────────────────────────────┐
│  COMPUTER BALANCING — Dynamics Research Corp.       │
│  Current Profile: none                              │
├─────────────────────────────────────────────────────┤
│  ─ SINGLE PLANE BALANCE — NEAR SIDE SENSOR ─        │
│     ┌──────────────────────────────────────┐        │
│     │          Correction Values           │        │
│     │  DRILL      945.53 cm.   at 321 Deg. │        │
│     │                                      │        │
│     │  UNBALANCE    3876.6833 oz-in        │        │
│     │              %109903.9766 gm-in      │        │
│     └──────────────────────────────────────┘        │
│                                                     │
│        ┌──────────────────────────────┐             │
│        │ Vibration  28.835   (mils)   │             │
│        │ Angle         141   (degrees)│             │
│        └──────────────────────────────┘             │
│                                                     │
│           ┌────────────────────────────┐            │
│           │ Rotor Angle is 141 Degrees │            │
│           └────────────────────────────┘            │
│ 1)Trim Piece 2)Next Piece 3)Report 4)Setup 5)Store Profile 6)Main │
└─────────────────────────────────────────────────────┘
```

Fig. 23

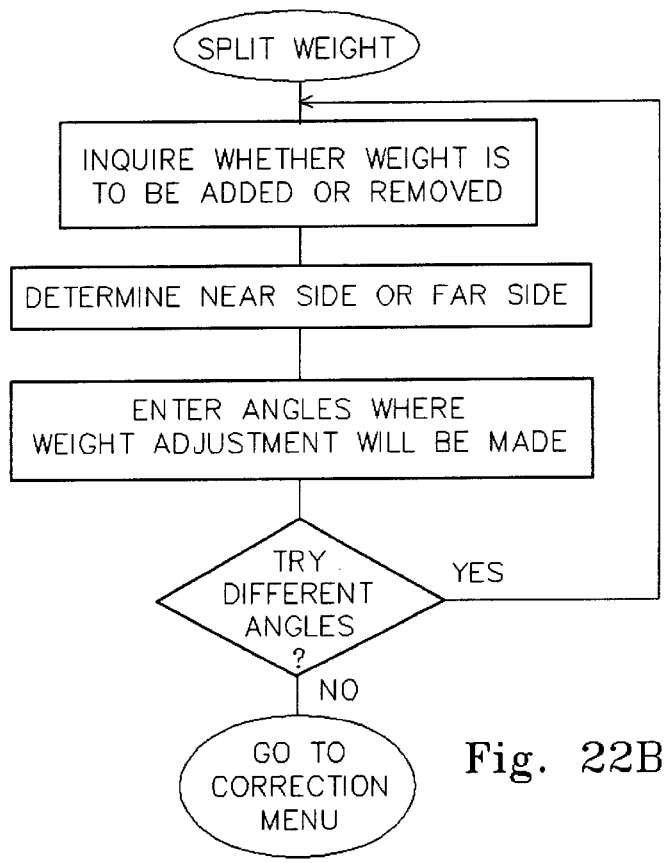

Fig. 22B

```
COMPUTER BALANCING — Dynamics Research Corp.
Current Setup: none
```

──────── Split Weights ────────

Near Weight Split
   The original correction for near side is  50.9 gm at 224 degrees Please enter the next closest angle where you are able to
   add weight clockwise from (greater than) 224 degrees: 230
   Please enter the next closest angle where you are able to
   add weight counter-clockwise from (less than) 224 degrees: 220

Results:
   At 230 degrees, add  20.4 gm
   At 220 degrees, add  30.6 gm

Rotot Angle is 224 Degrees

Fig. 22C

Jones Electric Motor Co., Inc.
1234 Any Street
P.O. Box 678
Yourtown, NY 12345
(800) 123-4567

BALANCE REPORT

Date: 06-09-1993
Job: 12345
Operator: Jose #345

Balance Speed:  600 RPM

Half Key Weight:
  Near Side = 57 grams          Far Side = 68 grams

Near Side = long shaft end    Far Side = short shaft end

Initial Unbalance
    Near Vibration:   5.67 mils at 345 degrees
    Near Unbalance:   2.4682 oz-in or 69.9721 gm-in Far Vibration:    7.21 mils at 127 degrees
    Far Unbalance:    0.9341 oz-in or 26.4825 gm-in Finish Unbalance
    Near Vibration:   0.21 mils at 324 degrees
    Near Unbalance:   0.0902 oz-in or 2.5572 gm-in Far Vibration:    0.19 mils at 156 degrees
    Far Unbalance:    0.0649 oz-in or 1.8398 gm-in Weight
Near:    23.32 grams or 0.82 ounces
Far:     8.83 grams or 0.31 ounces This unit has been precision balanced using our State-of-the-Art Dynamics Research Corp. Computer Balancer

Fig. 25

DYNAMIC BALANCER ELECTRONIC ANGLE FINDER

FIELD OF THE INVENTION

The present invention relates to a method for determining the exact point for mass adjustment when correcting unbalance of a rotating mass. More particularly, it relates to a method for locating the point for mass adjustment of a rotating mass based on angular data derived from a means monitoring the rotational history of the drive motor of the balancer.

DESCRIPTION OF THE PRIOR ART

Unbalance is the most common cause of vibration in rotating machinery. Approximately 80% of vibration problems in machinery are associated with unbalance.

Unbalance causes the rotating part to wobble instead of spinning smoothly. This produces a vibration with a frequency equal to the RPM of the part and amplitude proportional to the amount of unbalance. The greater the unbalance, the greater the displacement of the vibration.

Balancing a rotating part consists of locating the heavy spot on the rotor, and adding an equal weight to the opposite side or removing a weight from the heavy side. It makes no difference whether you add or remove weight. The idea is to get equal distribution of weight around the rotating center line.

Contemporary measuring equipment permits unbalance to be reduced to low limits. However, achieving satisfactory results with available equipment requires the use of trained, highly skilled operators to determine to what extent the unbalance must be reduced, the amount of mass correction required, replacement of the correction and where the economic and technical compromise on balance quality lies.

The foregoing problems are addressed by numerous prior art systems which employ static and/or centrifugal balancing. The more effective is usually a centrifugal balancing technique employing a shaft synchronous averaging approach which in recent years has been simplified from an operator standpoint through the use of personal computers or the more costly addition of dedicated microprocessors to balancing systems. In such systems, a non-contacting pick-up is utilized as a reference device to measure vibrations generated by the rotor. The vibration data is correlated with the rotation of the mass to provide an indication of where corrective weight adjustment is required. Next, trial weight adjustments are made until optimum centrifugal balance is achieved. This a time consuming, labor intensive operation even when aided by known computer technology.

Examples of computer aided balancing and other prior balancing techniques may be found in the Schenck Trebel publication "Fundamentals of Balancing" published in April 1990 which is incorporated herein by reference.

A specific example of balancing using trial weights combined with a dedicated microprocessor driven system is presented by U.S. Pat. No. 4,535,411 on "Field Balancing Apparatus" issued to B. Blackburn, et al. This system simplifies the operators task by providing prompts on a display means which leads the user through a series of trial runs and requires operator selection of a vibration profile deemed by the operator as being representative of the optimum transducer output representing the unbalance. This selection process includes tuning filters to their optimum frequency for the work piece. The manual functions demand a skilled, experienced operator and are the source of time consuming, costly delays as well as inaccuracies in the final balance. These problems are magnified by a requirement to preform a trial run without correction followed by a trial run with a trial weight at 0 degrees which is followed by a calculation that provides an offset angle from zero degrees for balance correction but no radial location and a correction weight as a function of the original trial weight.

In some prior art systems balancing is accomplished without the use of trial weights. U.S. Pat. No. 4,357,832 on "Digital Electronic Balancing Apparatus" issued to B. Blackburn, et al is an example of such a system. It obtains vibrational characteristics of the rotor by vibrating the rotor bearing supports at a known frequency during a trial run. Such systems have many disadvantages, not the least of which is errors introduced by variations in the effects of the vibrators resulting from variables related to the balance system per se and/or the work piece.

U.S. Pat. No. 5,089,969 on "Shaft Synchronous Balancing Apparatus" issued to C. Bradshaw et al. is an example of synchronous balancing using a general purpose computer. In this system the mass to be balanced is rotated at a known rate and transducers provide vibration responsive output signals relative to selected balance planes as in the Blackburn, et al devices of the prior discussions. The transducers are incrementally sampled based upon the angle information derived from a rotational monitoring device. The data is digitized and manipulated with the aid of a computer of the type usually referred to as a personal computer or PC. The microprocessor in the device runs a routine which averages the data falling within predetermined limits and develops offset corrections. This system requires the operator to select a gain adjustment from a plurality of available preset values, a process that can lead to corrupted data and faulty balancing. This system has the further disadvantage of incorporating the problems of Blackburn, et al '832 and '411 discussed above.

Prior balancing systems which use a filter employ a fixed frequency filter or one that is tuned by hand using trial and error methods or a strobe light to synchronize the filter with the operating speed. They do not track the speed and account for speed variations therefore providing less accurate displacement and phase readings.

All prior dynamic balancing systems have a common feature which, in reality, is a common problem. They use a zero degree reference mark placed on the work piece and sensed by a photo optic sensor. The position of the suggested unbalance correction is referenced from that point on the work piece where the zero reference mark is placed. By rotating the work piece by hand until the reference mark is at the top dead center position on the rotor, the operator estimates where correction should be made by placing a protractor on the end of the shaft and sighting where the suggested position should be located. Other methods suggest that the operator imagine the work piece as a face of a clock with each hour representing 30 degrees. Each of these methods are subject to error and only accurate to approximately 10 degrees depending on operator skill.

On direct drive machines which utilize a drive shaft and coupling arrangement to rotate the work piece through the end of the shaft, a wheel which is graduated into 360 segments representing 360 degrees is rotated with the driving device in exact sync with the work piece, thereby producing the ability to indicate the correction position on the work piece within 1 degree.

Belt driven machines have utilized similar methods of indicating the angle of correction by mounting an encoder on the work piece but this method can produce unbalance in the work piece or limit the sensitivity of the balancer by adding mass to the work piece. Other methods rely on entering the exact diameters of the driver pulley and the driven work piece into a calculation to determine the number of pulses per revolution of a motor driven encoder per revolution of the work piece.

The various methods used to determine mass adjustment sites have one thing in common, they are estimates subject to error.

OBJECTIVES OF THE INVENTION

The primary objective of the present invention is to enhance computer aided balancing by providing a method where an operator is provided with increased precision in placement to weight adjustment derived from maximum displacement of the work piece while it's in rotation, the position of the displacement relative to a reference point, and the current angle of the work piece relative to the reference point.

Another objective of the invention is to provide a balancing method wherein the optimum placement for weight adjustment is derived from an optically monitored incremental encoder attached to the drive motor of the balancer.

A still further objective is to provide an electronic interface between a centrifugal balance machine of the type which incorporates drive motor, drive belt, rotation sensors, vibration sensors and a personal computer.

SUMMARY OF THE INVENTION

In a preferred version of the invention, a centrifugal balancer using hard or soft bearings is combined with a computer system programed to suggest trial weights and placement and correction weights and placement. The computer runs an interactive menu driven program including a plurality of centrifugal balancing sequences. Vibration responsive transducers provide analog signals representing the magnitude of vibration in the load bearing planes of the work piece. These signal are input to automatic multi-gain amplifiers in a computer interface. The outputs of the amplifiers are filtered by bandpass filters which are center frequency adjusted to the rotational frequency of the work piece. Peak detectors rectify the outputs of the filters and an analog-to-digital converter processes the outputs of the peak detectors. A timer is used to attain the rotation speed of the work piece. This is attained by using a Fiber Optic Sensor, referred in this document by this name, or just "sensor", which detects a reference point on the work piece and then determining the elapsed time between reference point detections. This sensor output is also used to determine the angle of mass adjustment. The elapsed time between the reference point detection and the detection of mass adjustment is compared to the time for one revolution, or the elapsed time between reference points. This ratio, multiplied by 360, gives the angle of mass adjustment relative to the reference mark placed on the work piece and detected by the sensor. The data produced by the digital-to-analog converter and the timing data produced by monitoring the sensor are supplied to the computer for manipulation by the algorithms producing mass adjustment and placement data.

The current rotation angle of the work piece presented to the operator is also relative to the reference mark placed on the work piece and is determined by using an optical encoder attached to the drive motor. The optical encoder rotates at the motor speed (RPM) which is some ratio of the work piece rotation speed depending on the size of the drive pulley which is located on the motor and the diameter of the work piece where the belt is applied. The optical encoder generates 4000 pulses per revolution and is operational in either the clockwise or counterclockwise direction. The zero degree reference mark on the work piece is read by the Fiber Optic Sensor and is used to start a counter which counts the number of pulses from the encoder on the motor during one rotation of the work piece. This number is divided by 360 resulting in a number representing 1 degree of rotation of the work piece. Because of belt slippage, the count between zero reference pulses as supplied by the sensor can vary especially during starting and stopping when slippage is most severe. For this reason, we use a routine of sampling the counts between revolutions only after the work piece has come up to proper balancing speed, as indicated by monitoring the time between reference points obtained by our fiber optic sensor. Before a number count is accepted, two sets of data are read, put through a standard deviation algorithm to eliminate inconsistent data, then averaged together. This assures that no belt slippage is occurring during the sample. If during the stopping procedure, an acceptable degree count is not obtained, the operator is instructed to turn the work piece one full revolution by hand which assures a proper calibration of the Optical Encoder to the work piece.

With the encoder calibrated exactly to the work piece rotation, the angle, either directly below the Optical Zero Detector or opposite it, can be displayed on the computer's display monitor thereby indicating within 1 degree as to where corrections should be made on the work piece. This method has the advantage that nothing has to be directly fastened to the work piece that could effect it's balance as is the case where a drive shaft and coupling arrangement is used, and locations on the work piece can be determined to within 1 degree even on the more universal flat belt drive machines.

After the encoder is synchronized with the rotation of the work piece, the system begins to calculate weight correction.

The interactive menu driven program directs the balance system operator through the steps required to input data which it uses in calculating the mass and angular placement of a trial weight. The program sequences through routines which perform Single and Two Plane Balancing, Force Balancing and manual Balancing. The routines provide computer displays in the form of menu driven screens which require operator input to verify data and perform mechanical tasks related to the balancing process. In addition, the program directs the formulation of reports on the balancing process, prints the reports, and stores balance data to be used to simplify balancing of duplicate work pieces.

DESCRIPTION OF THE PREFERRED DRAWINGS

FIG. 6B illustrates the screen containing the menu driven sequences required for half key setup for Single Plane Balancing.

FIG. 6C illustrates the screen containing the standards available for balancing.

FIG. 7 illustrates the screen containing the menu driven sequences required to setup for Two Plane Balancing.

FIG. 8 illustrates the screen containing the menu driven sequences required to setup for Force Balancing.

FIG. 14 illustrates the calibration setup screen as it is presented to an operator after samples have been taken and evaluated and requesting verification of acceptance of a suggested trial weight.

FIG. 15 is a calibration setup screen requesting the operator to verify the calibration weight angle.

FIG. 21 illustrates a facsimile of the screen instructing the operator to remove calibration weights and inform the computer that the weight has been removed.

FIG. 22B is a logic flow diagram illustrating the split weight routine required to calculate and display the correction weight values for this program selection.

FIG. 22C is the menu driven screen prompting the operator for split weight operations.

FIG. 23 is the final correction screen created by the logic illustrated in FIG. 22 presenting the correction values in terms of drill depth and drill location and instructing the operator to select a branching subroutine.

FIG. 25 is exemplary of a balance report prepared automatically by the system in response to the operator selecting the report subroutine.

DETAILED DESCRIPTION OF THE INVENTION

To provide the most comprehensive explanation of the subject mass adjustment point location finding means, the present invention is described as it might be used in a centrifugal balancing machine such as described in the Schenck Trebel publication "Fundamentals of Balancing" published in April 1990. Such a system is provided with a transducer at each work piece support bearing for sensing the vibration frequency and amplitude of the rotating work piece or rotor. The machine includes a means to sense each revolution of the rotor and the present invention provides a means to identify angular displacement in degrees, or functions there of, from the start of each revolution to the point of maximum displacement of the vibration responsive transducer during the following 360 degree of rotation of the work piece. Signals from the transducers and rotation sensing means are processed by circuitry adapted to convert the analog output of the transducers on any centrifugal balancer to digital data representing vibration magnitude with an angle relationship to work piece rotation which according to the present invention is derived from a work piece RPM function. The data serves as an input to a conventional computer such as a personal computer or PC. The PC is driven by software which, when combined with special purpose hardware, forms the basis for this invention.

Figure 1:
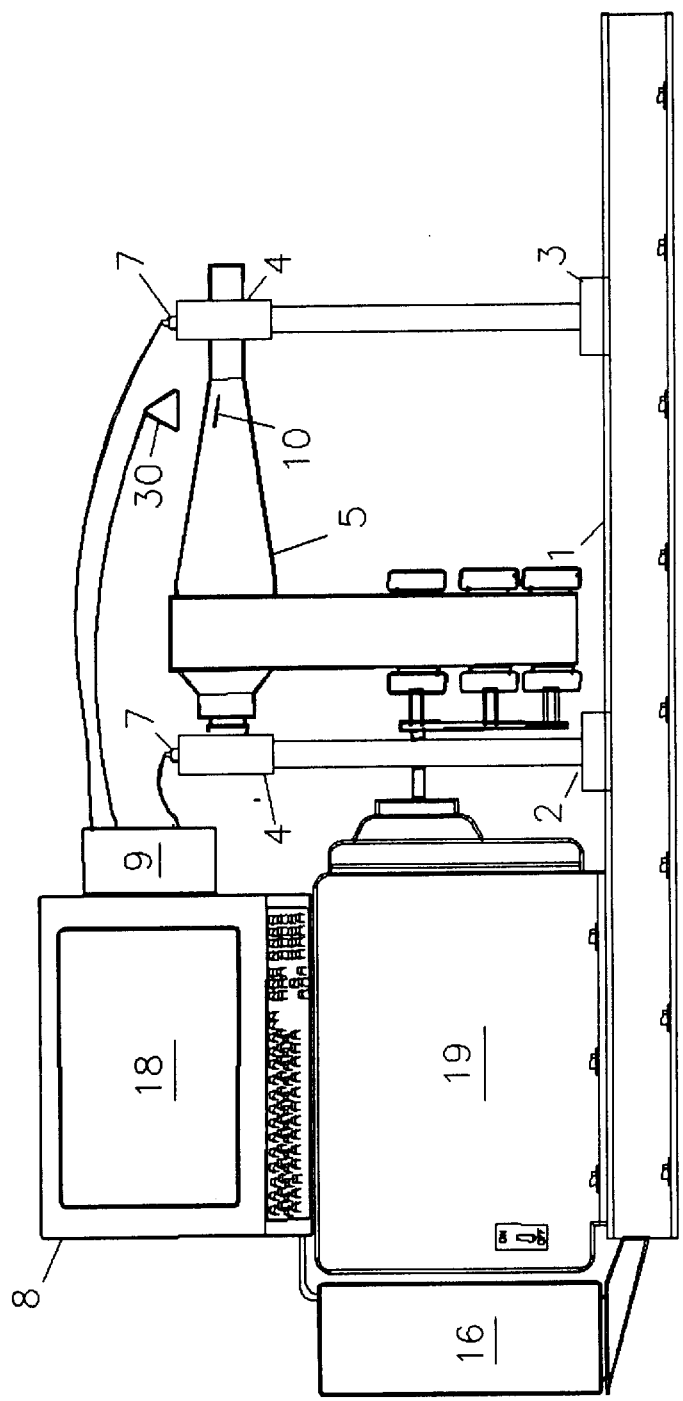
FIG. 1 illustrates the component parts which form the exemplary balancing system and their interconnections.

In the preferred embodiment, the exemplary balancer is controlled by a computer system 8 which includes a display/terminal keyboard 18, a printer 16 and an interface 9, FIG. 1. The actual balancer consists of a bed or base, 1, two upright supports, one fixed, 2, and one movable, 3, to adjust for different center distance between bearing surfaces, 4, of the work piece, 5, and a drive system consisting of a variable speed motor 19 and an incremental encoder 20, which may be a mechanical transducer, a magnetically responsive transducer, or an optical sensor. The incremental encoder can be any one of the various angular position sensing encoding means available. The output of the drive system includes a drive pulley, idler pulleys, drive belt, and tensioning device. For larger work pieces, two beds may be combined to allow for unlimited length of the work piece. In such configurations, one upright support is placed on one bed and one on the other.

The upright supports house a flexible support system for the anti-friction roller bearing assemblies which support the work piece while it is rotated in the machine. The flexible supports are designed to provide a low natural frequency (usually under 2 hz). In the trade this is referred to as a "Soft Bearing Balancer" because it operates at a frequency above that of the first critical or natural frequency of the support system. However, the invention presented by this patent may be used with equal success in "Hard Bearing Balancers".

In a soft bearing machine, when the work piece is rotated above the first critical frequency of the support system, the displacement of the work supports is proportional to the unbalance in the work piece. Multiplying the weight of the work piece supported by the bearing support assemblies, plus the parasitic mass of the supports, in ounces, times this displacement in inches, will produce an answer equal to the unbalance in ounce-inches which can be represented by a given weight in ounces operating or attached to the work piece at a given radius (inches) from the rotating center of the work piece. The present invention has the capability, via algorithms driven by the software, to work in either U.S. units of inches and ounces or metric units or mix the two. The angular position of the unbalance is at a point relative to the peak of the displacement of the work supports during each revolution.

The machine utilizes two direct prod velocity pick-ups, 7, to measure the excursion of the work supports. The pickups consist of a fixed coil with a magnet supported within the coil which is attached to a shaft which is attached to the work piece support utilizing another magnet. When the work piece support moves, it moves the magnet within the coil, thereby producing a voltage which is proportional to the velocity of the magnet (and the work piece). This signal is sent to the computer, 8, via an electronic interface, 9, which is illustrated in greater detail in FIG. 2. It is integrated, 12 or 22 of FIG. 2, to produce a sinusoidal signal which is proportional to the peak-to-peak displacement of the work piece.

The velocity pick-ups (transducers) have a sensitivity of 250 mv./inch/second (peak). The signal produced by unbalance is equal in frequency to the RPM of the work piece The RPM of the work piece is accurately determined via an optical sensor which incorporates a fiber-optic sensing device which allows accurate calibration of the integrator to obtain displacement readings in mils or thousandths of an inch. Integrating the signal provides a signal amplification which increases the sensitivity and accuracy of the balance. Lower frequencies are amplified to a greater extent than high frequencies by the integrator. Because balancing is accomplished at a low frequency (RPM) and much of the electronic noise with the signal is at 60 hz and above, integrating increases the signal-to-noise ratio. This aids in increasing the sensitivity of the balancing machine and its accuracy.

The displacement readings are taken several times and averaged. This procedure is repeated and the two averages are compared. If they agree with each other within a predetermined tolerance, the reading is accepted and used in the calculations. If they do not agree, the readings are thrown out and the process is repeated until accurate measurements are obtained. This unique process is superior to the prior art which allows an operator to take a sample of the data during one cycle by depressing a "Capture and Hold" switch. Other methods require the operator to obtain displacement (amount) and phase readings using a strobe light or other method and manually inputting this data to the computer program.

Figure 2:
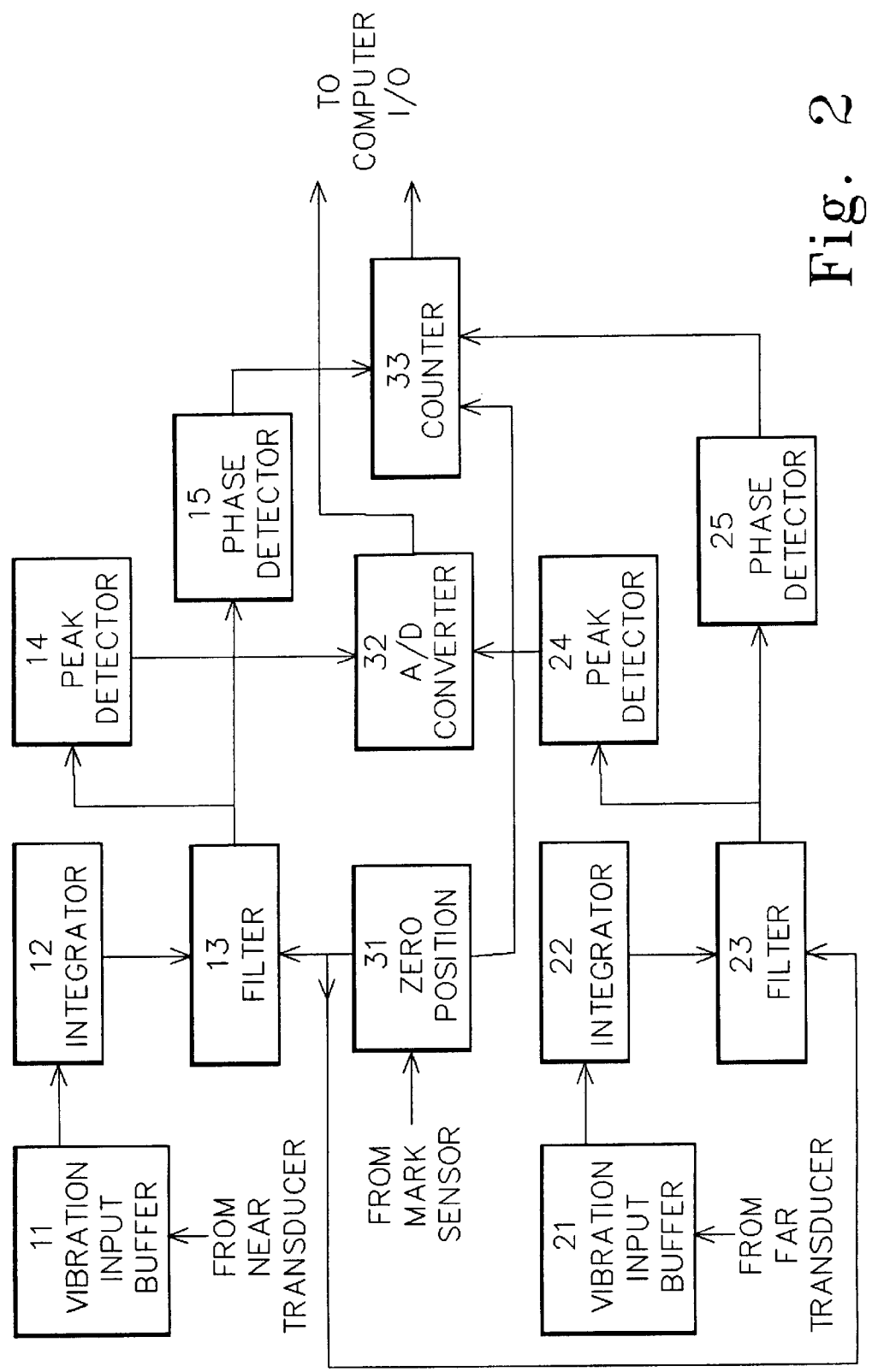
FIG. 2 is a detailed block diagram of the transducers and sensor adapted to monitor a work piece during balancing and the angular displacement counter of the present invention which is adapted to function as an interface to the computer of the exemplary balancing system.

After integrating the signal, it is filtered using a phase lock loop, digital type, bandpass, high Q, filter, 13 or 23 of FIG. 2. A phase sensing device, 31, is used to trigger the phase-lock-loop filter. The filter eliminates unwanted frequencies in the raw signal thereby increasing the accuracy of the displacement readings. The filter, because it is tuned by the signal produced by the phase sensor, tracks the frequency of the work piece in spite of minor speed changes. This allows the "Q" or sharpness of the filter to be very high without worry of the speed changing and having the filter distorting or attenuating the signal by being mistuned to the operating frequency. Prior systems use a filter that is tuned by hand using a strobe light to synchronize the filter with the operating speed. They do not track the speed and account for speed variations and therefore provide less accurate displacement and phase readings.

Work piece rotation is tracked by placing a reference mark, 10 of FIG. 1, typically a piece of reflective tape, on the work piece, 5. When the reference mark passes the fiber optic sensor, 30, it causes a positive electronic pulse to be generated. This pulse represents the 0 degree reference point. The computer divides the time during one revolution of the work piece (between the pulses) into 360 parts representing 360 degrees. The 0 cross over point of the sinusoidal wave of the peak-to-peak displacement signal is compared to this timing function and the "Relative phase angle" of the signal is established. Because the displacement signal, which was obtained through integration, is 90 degrees ahead of the original "Velocity" signal produced by the pick-ups, this angle (90) is subtracted from the relative phase angle to provide an approximate true angle of the unbalance relative to the mark, 10, that was placed on the shaft. To attain the maximum accuracy in reading this angle, the same averaging method used to determine the displacement of the work piece is used. Accurate phase measurements are essential in accurately calculating the amount of unbalance and cross effect using vector summation. Other systems use a "sample and hold" procedure when they obtain this data which is not as accurate. This system can read the angle within 1 degree. Other methods using a strobe light or the sample and hold method, rely on the operators skill and are only accurate to 5 to 10 degrees.

FIG. 2 is a block diagram of the electronic circuitry used in a preferred embodiment of the invention to create the data required by the computer from the balancing machine transducers and rotation sensor. The circuitry measures analog signals and translates these signals into digital data which is read into the computer and analyzed to accomplish balancing. The circuit includes two identical input channels, one for near and one for far side plane vibration displacement, a phase detector, and an analog-to-digital converter and a counter which serve as amplitude and angle input means to the computer.

The vibration signals for the near and far sides originate from accelerometers and are input into the circuit through the vibration input buffers 11 and 21. The buffers include automatic multi-gain amplifiers which amplify the signals according to their dc level. The buffers are identical but one contains an additional switching means which channels the near and far side inputs to the same channel during Force Balancing.

The output from the multi-gain amplifiers of the input buffers 11 and 21 are applied to their respective integrator 12 or 22. In the preferred embodiment, each integrator translates the signal into its displacement equivalent. The integrators have a switch which discharges a storage capacitor during gain switching to keep the integrator op amp from going into saturation, thus eliminating excess settling delays during gain switching. The displacement signal is then routed through a variable digital filter circuit, 13 or 23, to minimize the effects of noise and non-relevant vibrations. The digital filter has a very narrow bandwidth and a center frequency that is derived from the zero position trigger source through the zero position circuit 31. This ensures that the filter's center frequency is the same as the rotational frequency of the part being balanced. The input to the zero position circuit, the zero position trigger source, is an optical mark sensor in the preferred embodiment. The fiber optical sensor detects a strobe mark which is placed on the edge of the rotor before setup. All radial references are relative to the strobe mark.

The displacement signal from the filters is applied to two circuits, a peak detector circuit, 14 or 24, for measuring maximum vibration level and a zero crossing circuit, phase detector 15 or 25, for measuring relative phase angle. The peak detector circuit rectifies the ac displacement signal and filters it through a capacitive filter. A switch across the filter capacitor discharges the capacitor gain switching. The switch is responsive to the same control input as the switch in the same channel integrator circuit.

The DC level measured across the capacitor of the peak detector represents the peak vibration of the rotating part. This DC level is converted to a digital data signal by an analog-to-digital converter, 32, before being read into the computer through a digital port. This digital data represents the maximum vibration excursions at the balance plane. The input to the A/D converter, 32, is controlled by a switch which determines whether the input is from the near channel circuits or from the far channel circuits.

The speed of rotation of the work piece is determined by comparing elapsed time of one revolution of the work piece to the speed counter's calibrated clock frequency, which can be varied depending on the required rotational speed range of the machine. The speed counter resides on the circuit card used for obtaining data from the fiber optic sensor and the displacement pick-ups. It is not the same counter that is present on the optical encoder.

The relative phase angle is based upon the same speed counter that is used to obtain work piece rotational speed, as mentioned in the previous paragraph. Data for the relative phase angle is measured by starting the speed counter with the phase trigger and stopping the counter when the displacement signal's sinusoidal wave is at zero degrees as detected by a zero crossing detector in each of the phase detectors, 15 and 25. This is accomplished by a control input to the counter from a zero crossing circuit in the zero position circuit 31. The same side select switch which determines the path to the A/D circuit is used here to determine which zero crossing signal (near or far) stops the speed counter. The relative phase angle is determined by the computer which compares the time elapsed between the zero crossing as read by the fiber optic sensor and the zero crossing of the displacement signal to the time elapsed for one revolution of the work piece. This ratio is multiplied by 360 to get the number of degrees from the reference point marked on the work piece. The computer then takes into account angle offsets based on the physical locations of the pickups and the fiber optic sensor to determine the angle of mass adjustment that is conveyed to the operation. The work piece angle, which is the angle the computer determines the work piece is at and is conveyed to the operator, is derived by an optical encoder, which is attached to the drive motor. This encoder increments or decrements, depending on the direction of rotation. It produces 4000 counts per revolution of the motor. The computer, using the reference mark readings from the fiber optic sensor, determines the ratio between the diameter of the drive pulley and the work piece to determine the counter per revolution of the work piece. Knowing the counts per revolution of the work piece, the angle of the work piece is achieved from the counts supplied by the optical encoder.

Figure 31:
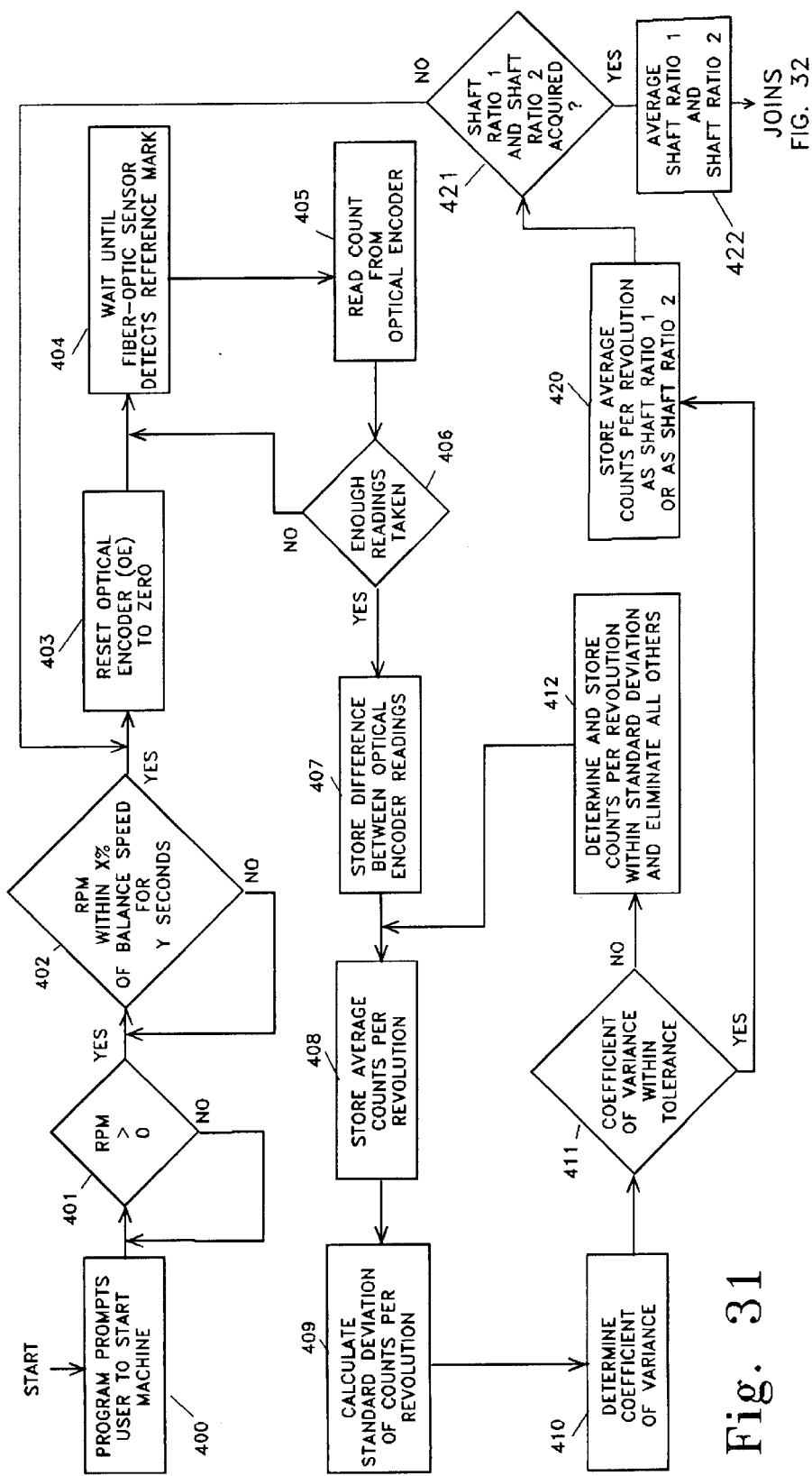
FIGS. 31 and 32 are a functional, logic diagram of the operations involved in determining the rotor or work piece displacement angle for mass correction.
Figure 32:
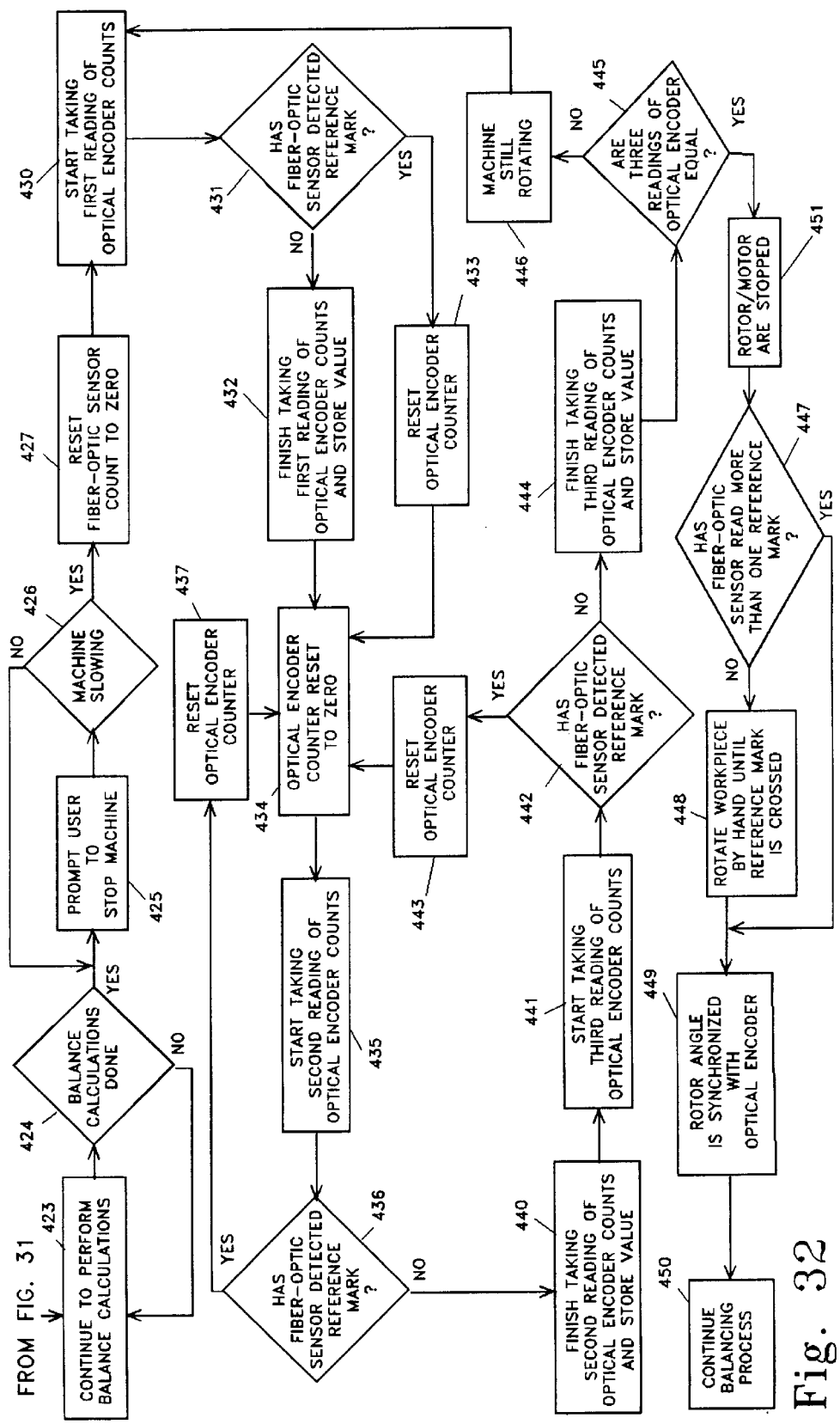

The logical operation of finding the angle of placement on the work piece, which comprises the present invention and is integrated into the exemplary balancing system is illustrated by FIGS. 31 and 32 and described as follows. When the system is initialized, the program prompts the user to start the machine, 400, of FIG. 31. The RPM is monitored to see if it is within a predetermined percentage of the balance speed for a predetermined period of time, 401 and 402. When balancing speed is achieved, the computer waits until the fiber optic sensor senses the reference mark on the work piece. When this occurs, the optical encoder is reset to zero, 403. It then continues to increment counts from zero in a pair of registers as rotation occurs (counter 33, FIG. 2). When the sensor senses the next reference mark, 404, the count from the encoder is taken by the computer, 405. After a predetermined number of readings have been taken, 406, at least five in the preferred embodiment, the system stores the difference between each optical encoder reading to determine a counts-per-revolution of the work piece, 407. The average counts-per-revolution is stored, 408, and the standard deviation of the counts-per-revolution is calculated, 409. A coefficient of variance is determined, 410 and tested to see that it is within tolerance, 411. If it is not within tolerance, the system determines which counts-per-revolution are within the standard deviation and then stores that information and eliminates those that are not, 412. Once the coefficient of variance is within tolerance, the average counts-per-revolution are stored, 420, as shaft ratio 1 or shaft ratio 2. The preceding operations are repeated until shaft ratios 1 and 2 are acquired, 421, then the two shaft ratios are averaged, 422, and the system proceeds with the balance calculations.

Blocks 423 and 424 of FIG. 32 represent functioning of the system which is not actually part of the rotor angle processing. These blocks represent steps required to conduct the balance calculation. Once the system has reached this point in this program, the optical encoder is not used again until the machine is commanded to stop.

The system prompts the user to stop the machine, 425, and the revolutions of the machine are monitored by the optical encoder. If the machine is slowing, 426, the fiber optic sensor count is reset to zero, 427. With the fiber optic sensor count set to zero and the machine rotating from its inertia, the system starts taking the first reading of the optical encoder counts, 430. The reading is completed when all three bytes of data are received by the monitoring software. The fiber optic sensor 30 of FIG. 1 is monitored at step 431 of FIG. 32 and if it senses the reference mark 10, the reading is terminated and the optical encoder counter 33 of FIG. 2 is reset, 433 of FIG. 32. If the first reading is successful, i.e. all three bytes of data are received before sensing the reference mark, the optical encoder count value is stored, 432 and the counter 33 is reset, 433.

The system then starts taking the second reading of the optical encoder counts, 435. Again, the phase detector 15 or 25 is monitored for a zero crossing while the optical encoder pulses are accumulated by the counter 33. When all three bytes of data are read, the second reading of the optical encoder is stored, 440. If the fiber optic sensor 30 sees the reference mark 10 before all three bytes of data are taken, 436, the optical encoder is reset, 437, and the optical encoder counter is reset to zero, 434, stopping the second optical encoder reading.

The system starts taking the third reading of the optical encoder, 441, and as long as the reference mark 10 is not detected by the fiber optic sensor 30, the system continues taking the third reading of optical encoder pulses and stores the value when all three bytes of data are read, 444. If the fiber optic sensor senses the reference mark before all three bytes of data are taken, 442, it resets the optical encoder counter 33 in FIG. 2, step 443 of FIG. 32 which stops the third optical encoder reading and synchronizes the optical encoder with the fiber optic sensor, 434.

After the system has made three sequential readings, 444, the question of whether or not the three readings of the optical encoder are equal is determined, 445. If they are not equal and the machine is still rotating, 446, the program restarts taking optical encoder readings to establish the rotor angle for mass adjustment (it is assumed that the machine is still rotating). Each time the encoder is reset due to a zero crossing read by the fiber optic sensor, the encoder is synchronized with this sensor. In other words, the encoder's reference point or zero mark is synchronized with the reference mark on the work piece. As the work piece is slowing, slippage is reduced to near zero, so the synchronization stays accurate. Since the encoder is constantly incrementing as the motor turns, three identical readings, 445, mean that there is no more rotation (i.e. the work piece rotor/motor are stopped, 451), and the synchronization is complete, 449, and the balancing process continues, 450. The synchronization is monitored by the software, 447, so in cases where the work piece does not have enough momentum to keep the machine rotating long enough for synchronization to occur, the operator is instructed to rotate the work piece by hand, 448. When the zero reference point is read by the sensor, the encoder is immediately reset to zero, thus syncing the encoder to the sensor. Rotation by hand is slow and has little acceleration, thus there is no significant belt slippage.

The signals converted to their digital equivalents by the circuits depicted in FIG. 2 are read into the computer via standard digital interface ports which are used for data transfer and control.

After the raw data enters the computer, it is analyzed to determine that the vibration amplitude and phase readings are stable. The vibration levels are read into the computer in a data set of multiple readings and run through a standard deviation routine which discards the readings which fall outside the standard deviation for that data set. The remaining readings are averaged and compared to previous data sets to determine the stability of the readings. This is repeated until the stability of the readings are acceptable or until the software times out.

The phase readings are measured in a similar manner to the vibration readings. The phase data sets are run through a standard deviation routine which discards the readings which fall outside the standard deviation of the set. The remaining readings are averaged and compared to the previous data sets to determine reading stability. This is repeated until the stability of the readings is acceptable or until the software times out.

In the case of both the vibration and phase readings, the operator has the option to accept any readings manually that have not settled within a reasonable amount of time.

The machine is multi-lingual via its program which includes instructions for producing all display screens in a selected one of a variety of different languages. The operator can choose the language with which he operates.

The machine can establish a proper tolerance to which the work piece should be balanced based on standards such as, Mil STD 167, I.S.O. (International Standards Organization) 1940, American Petroleum Institute (A.P.I.) standards and others using mathematical equations and provide a hard copy printout of the balancing operation and resultant corrections. The report format can be tailor made to customers requirements, including printing the report in any language desired. The basic report consists of: operators name, date of balance, speed of balance, starting unbalance preset, finish balance in ounce-inches, mils, gram-inches or other weight units. The report also shows weight of half keys used. The report can be printed or saved on a disk for future reference.

The computer screen displays the amount and angle as to where to add weight and where to subtract weight simultaneously.

The system can be setup to read drill depth corrections based on the weight of material per cubic inch.

It can readout in correction units of: ounces, grams, drill depth, or any other correction unit the user desires.

The computer does all of the data acquisition without aid of the operator. It sets it's own gain, samples and averages, and records the data. It is also self instructional.

The system uses "Direct Prod" velocity pick-ups to allow balancing at low speeds. The system typically balances at 300 RPM while others must spin the part much faster (800 to 900 RPM) due to the none linearity of the "seismic type" velocity pick-ups which they use.

The system calculates a suggested weight to use during the setup procedure (For a Trial Weight) based on the weight of the work piece, the correction radius, and the displacement of the work supports. This is critical but not done by other systems. Too little weight will produce inaccurate vector solutions. Too much weight can be dangerous to the operator or people stationed nearby and/or cause damage to the work piece.

The system is also capable of splitting a correction weight between two correction points. This problem occurs when the program calls for weight to be added for instance between two blades of a fan.

The software includes routines to record the actual time required to balance and report the data directly to an automated accounting system for billing purposes.

FIGS. 3 through 30 illustrate, through the use of logic flow charts and facsimiles of the menu driven instruction displays created by system, the methods employed by the present invention to achieve balancing.

Figure 3:
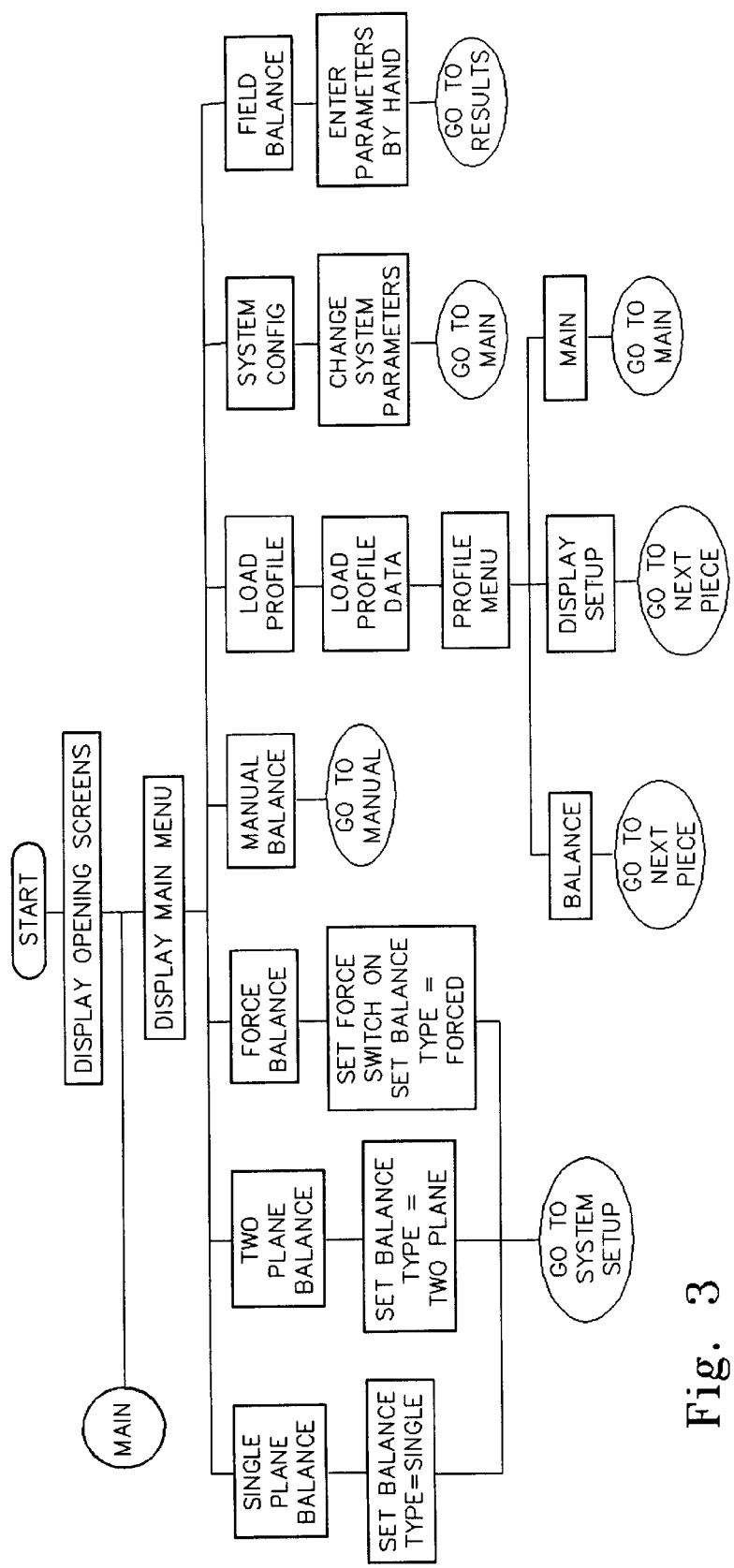
FIG. 3 is a logic flow diagram of the initial operation selection branching of the program of the exemplary balancing system.

FIG. 3 illustrates the preliminary steps which begins with the start of the program where immediately after "Start" is initiated, a "Display Opening Screens" is initiated. This routine calls up a main menu screen, FIG. 4, which instructs the user to select an option from (1) Single Plane Balancing; (2) Two Plane Balancing; (3) Force Balancing; (4) manual Balancing; (5) Field Balancing; (6) Load Balance Profile; or (7) System Setup.

Single and Two Plane Balancing are the normally used options but parts that are short in length when compared to their diameter require Force Balancing. Parts like single groove pulleys, propeller type fans, and pump impellers can be very difficult to balance in two planes due to the cross effect caused by the closeness of the correction planes. This is overcome by blending the signals from both pickups into one so that one correction can be made at the center of gravity of the part to obtain the optimum balance for both planes using just one weight. This procedure is limited to parts that rotate less than 3600 RPM and those which have a length to diameter ratio of less than 0.5 (less than ½ if of its diameter in length not counting the shaft extensions).

Figure 5A:
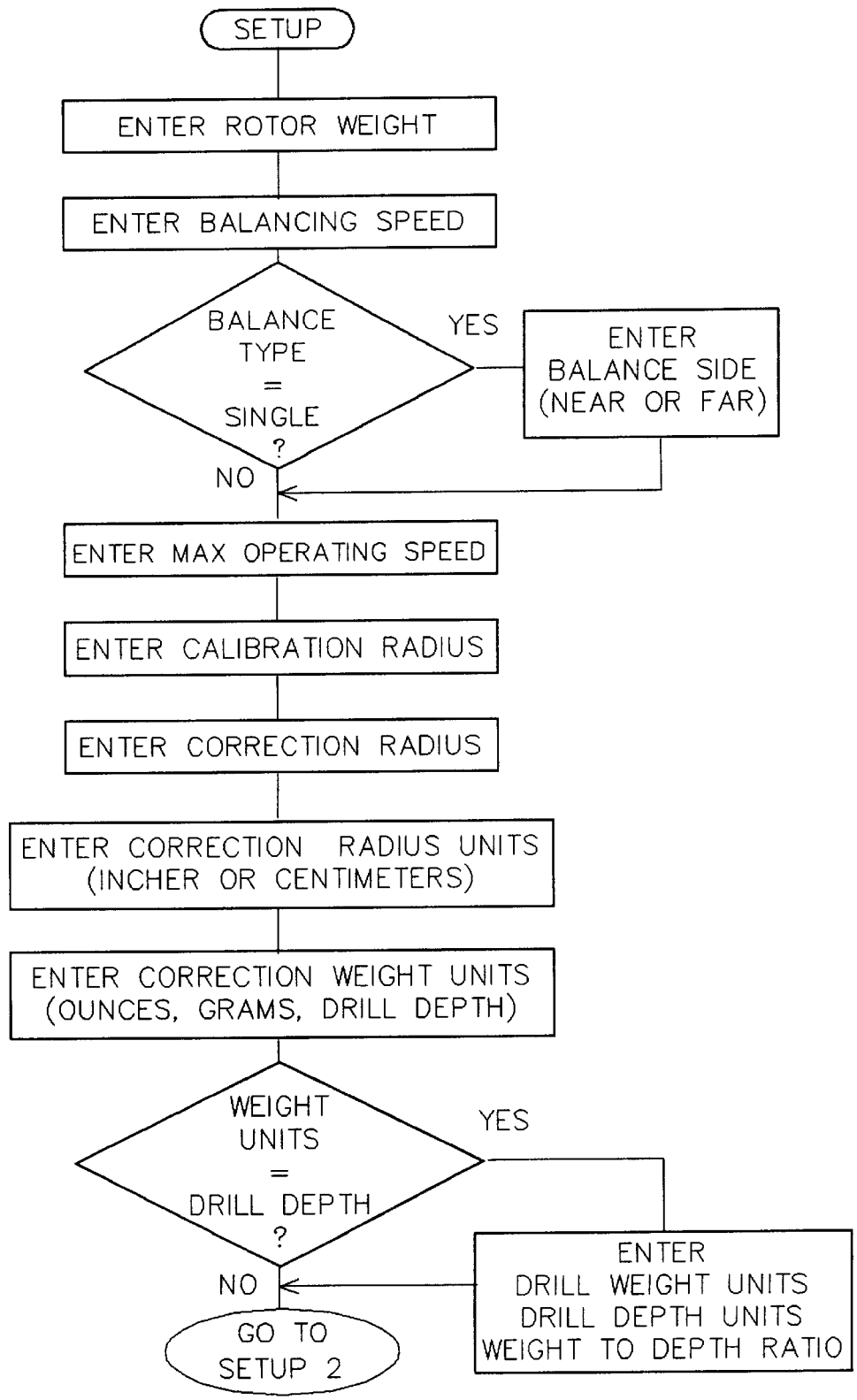
FIGS. 5A and 5B are a logic flow diagram depicting the operations involved in entering data for calculating the trial weight and its placement.
Figure 5B:
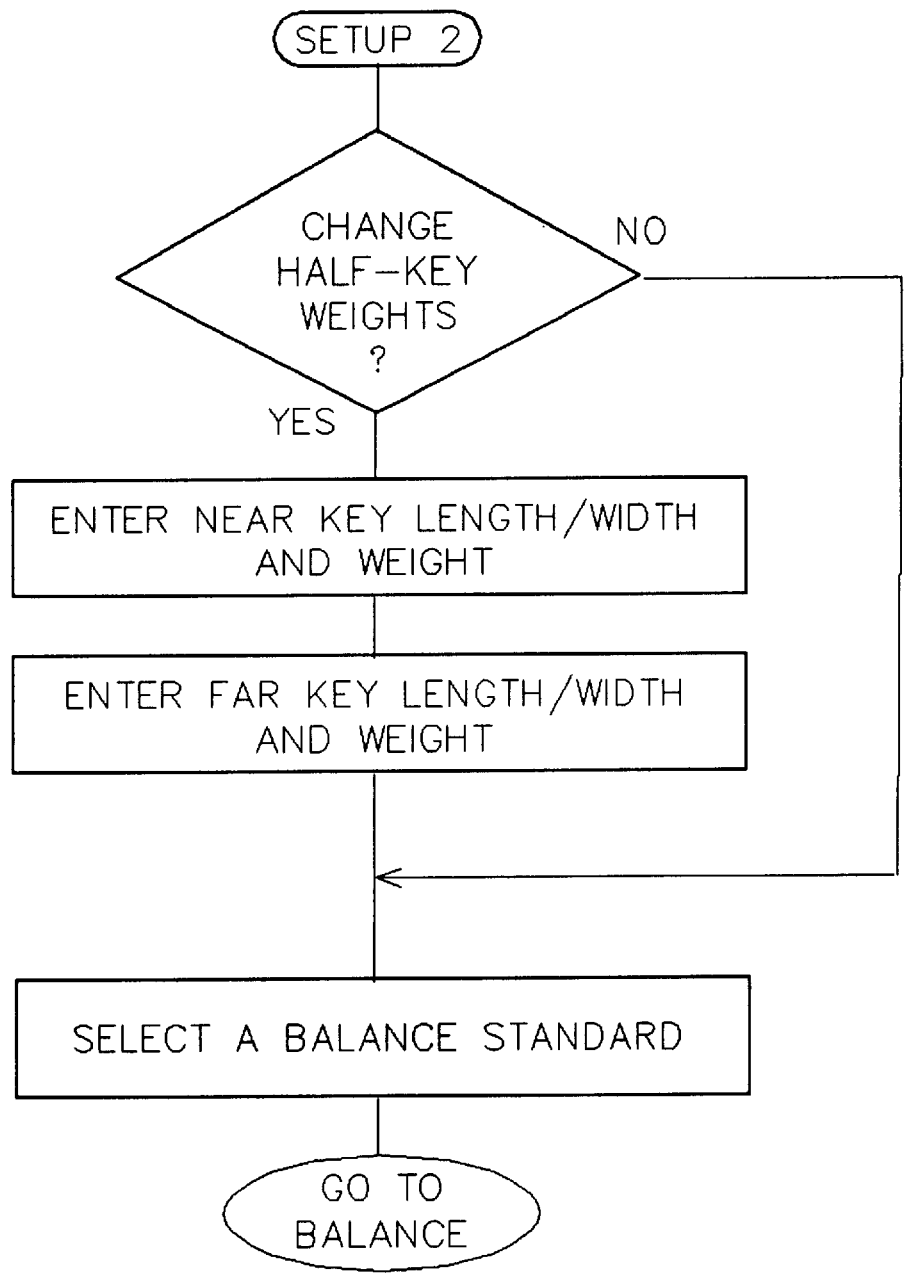
Figure 9:
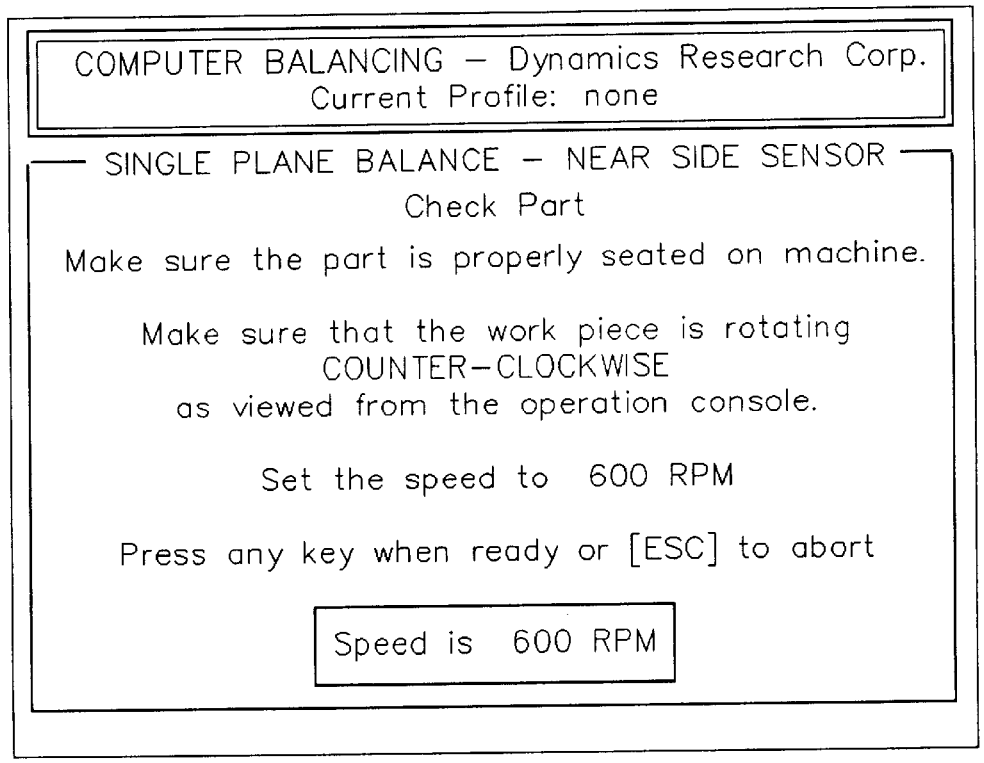
FIG. 9 is an exemplary screen display for a balance setup directing the operator to verify the mechanical configuration and set the rotational speed of the balancing machine.

If Single Plane Balancing, Two Plane Balancing or Force Balancing is selected, the program moves to the setup sequence illustrated in FIGS. 5A and 5B which illustrates the steps carried out during the setup routine for either Single Plane, Two Plane or Force Balancing. These routines initiate an appropriate setup menu screen, FIGS. 6, 7, or 8, which requires the user to enter the following information: rotor weight; balancing weight; sensor side; calibration radius; correction radius; radius units (IN. or CM.); and correction weight units (O/G/D). If "D", drill depth, is selected, drill weight units, depth units and weight/depth ratio inputs are solicited. As each unit is entered via the supporting computer input keyboard, the display automatically shifts to the next required unit and instructs the operator to enter the appropriate parameter. When all the data required by the appropriate menu screen is input, and proper setup is verified by pressing the "Y" key, another instruction menu screen is displayed. It directs the operator to verify mechanical configuration and set the rotor speed. FIG. 9 is exemplary of this screen for a Single Plane Balance setup.

Figure 11:
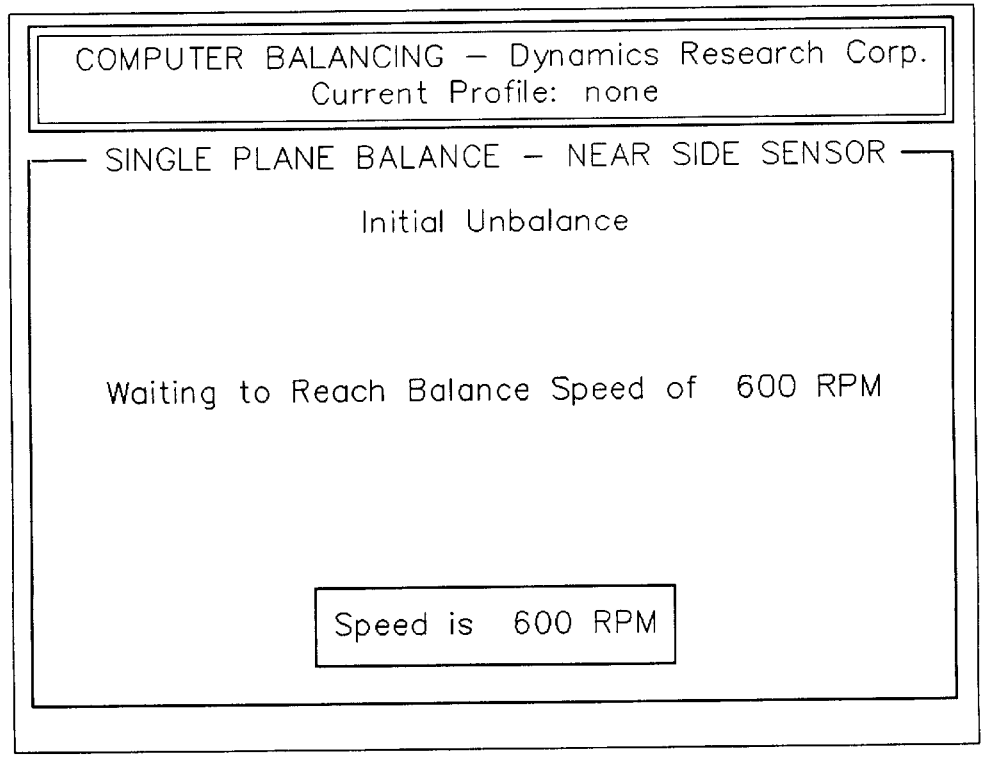
FIG. 11 illustrates the advisory message given by the computer to the operator that the system is waiting to reach balancing speed.
Figure 10:
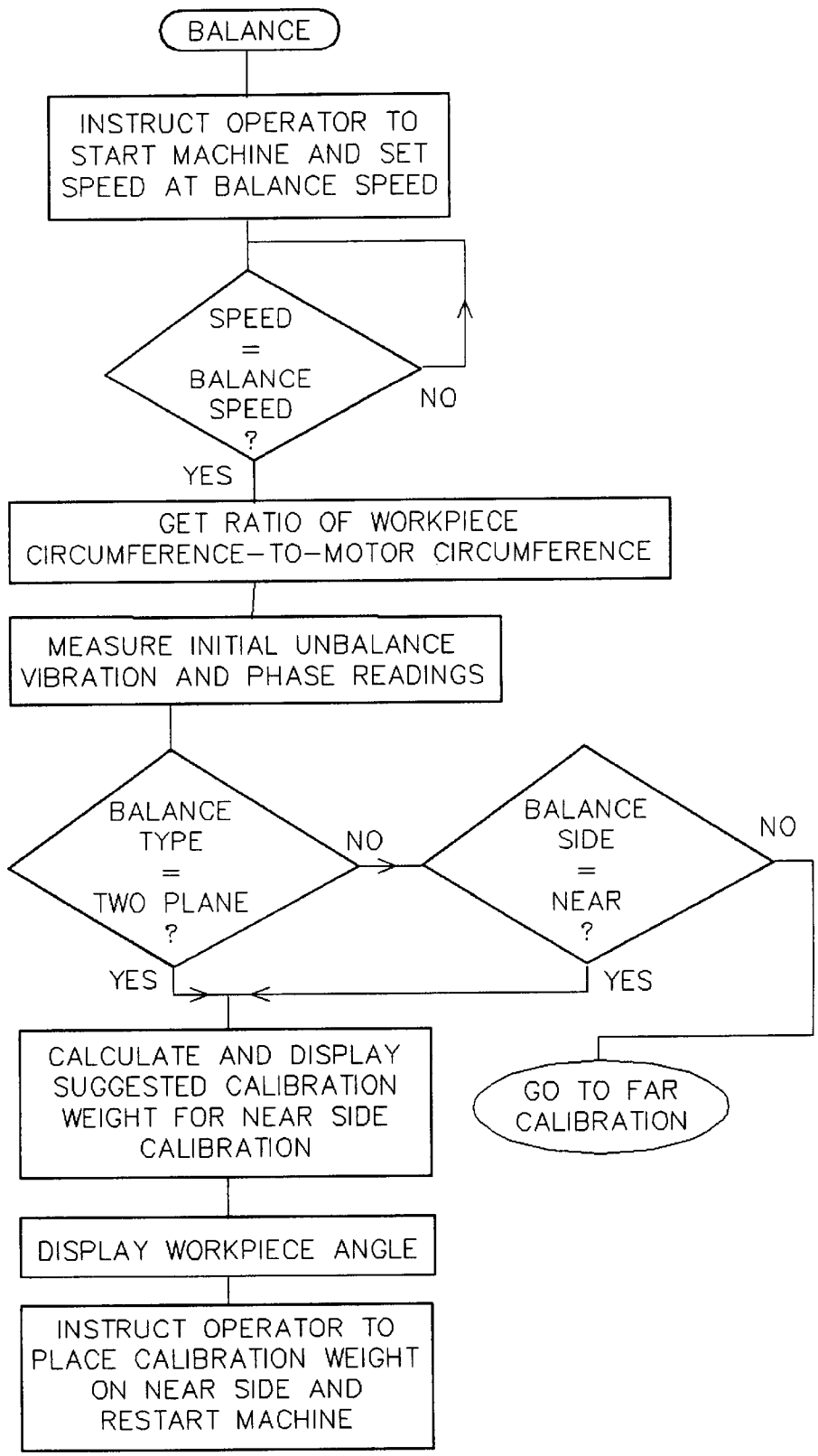
FIG. 10 is a logic flow diagram of the routines involved in producing a suggested trial calibration weight.
Figure 12:
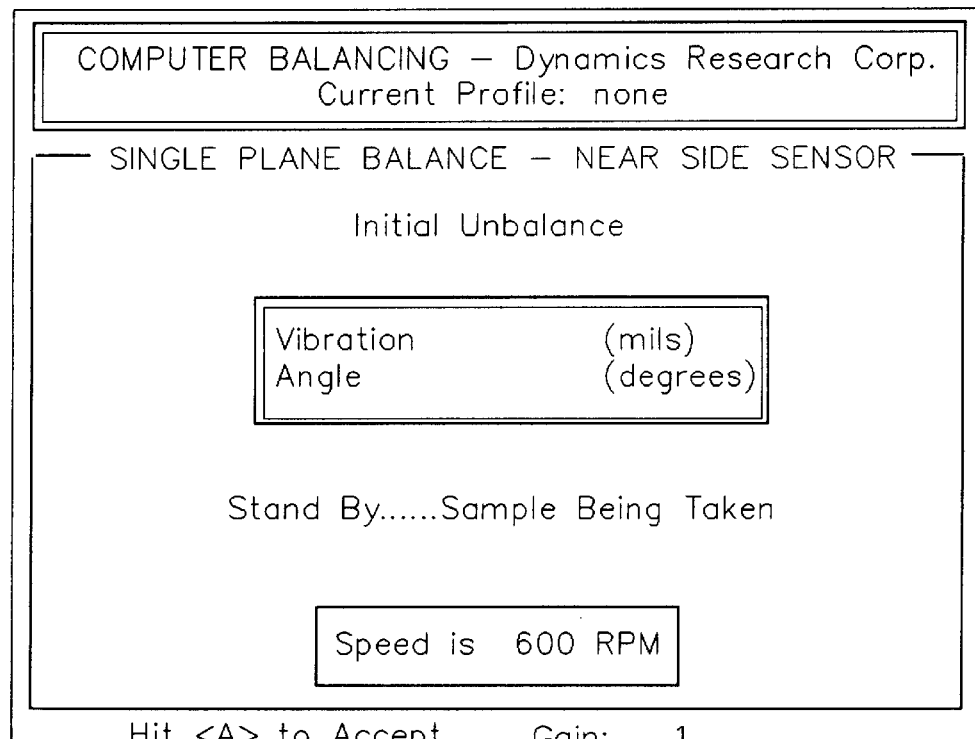
FIG. 12 illustrates the computer screen display advising the operator that the machine has reached balance speed and samples are being taken.
Figure 13:
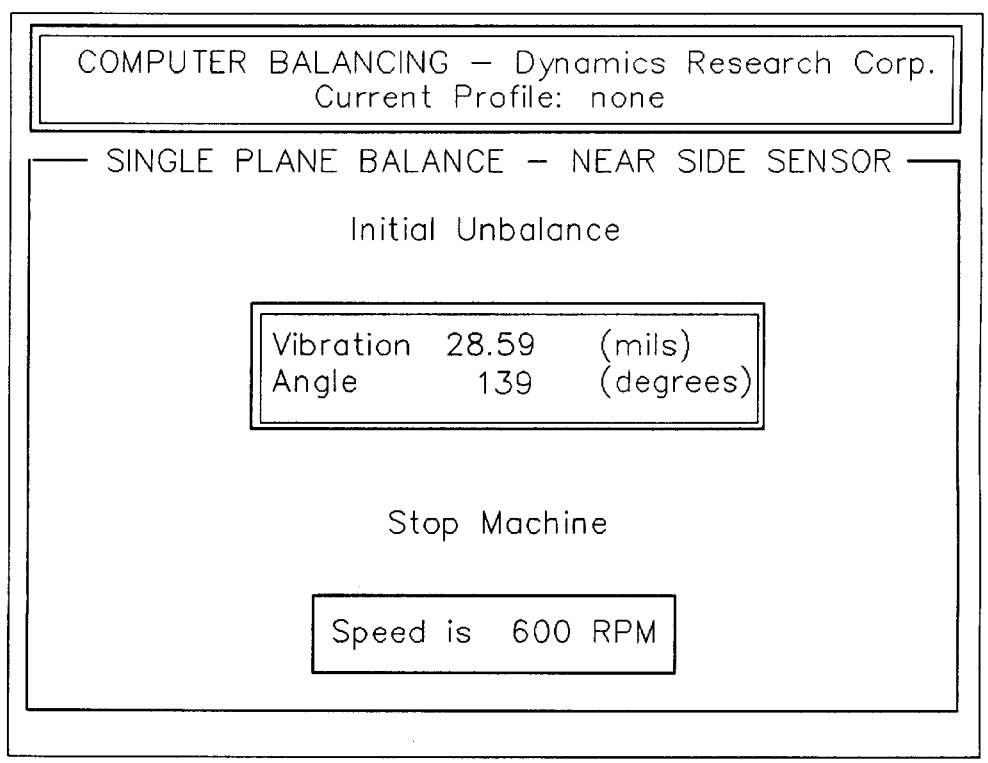
FIG. 13 is a facsimile of the screen presentation directing the operator to stop the machine after the samples have been taken.

The program now moves into the phase illustrated by FIG. 10. When the parameters have been set and accepted as indicated by the operator striking a key, the screen flashes a waiting to reach balance speed as indicated in FIG. 11. When balance speed is achieved and the optical encoder is initialized, the message is followed by a screen display which advises "Stand By . . . Samples Being Taken" as illustrated in FIG. 12. After the samples are taken, the operator is instructed to stop the machine, FIG. 13. This is followed by the display of FIG. 14 which requests confirmation that the suggested calibration weight is being used or the weight of the operator substituted weight. When the weight is accepted, the operator is asked to verify or substitute the placement angle as illustrated in FIG. 15. As soon as the angle is accepted, the calibration setup screen is displayed, FIG. 16. This screen provides the calibration weight and placement data. The operator confirms the setup and the program advances.

Figure 16:
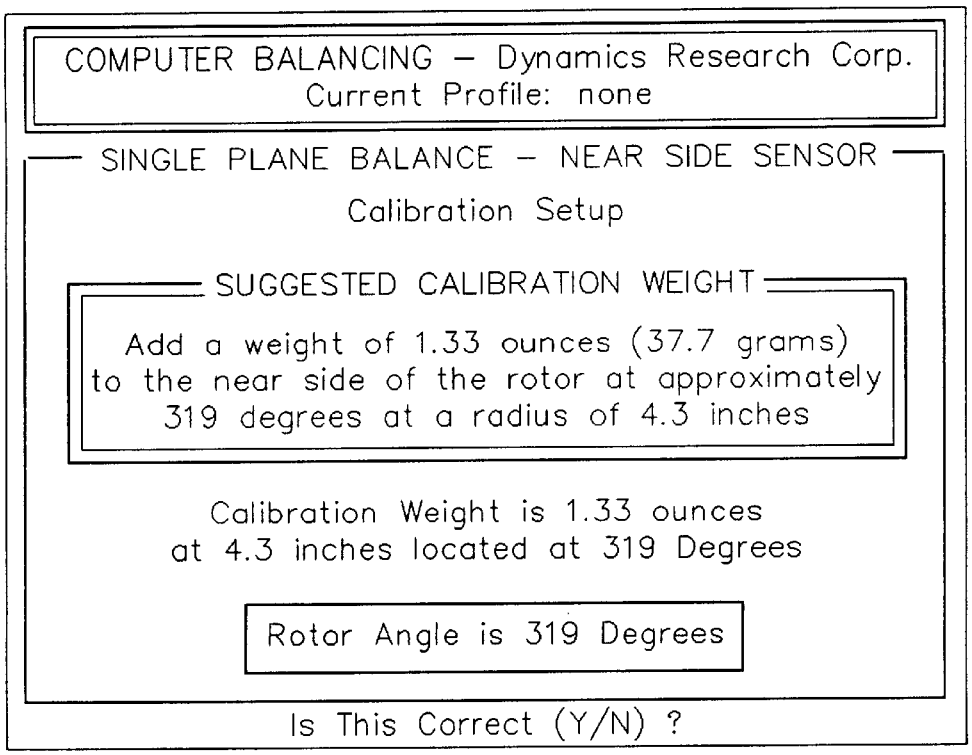
FIG. 16 is a facsimile of a calibration setup screen requesting verification of the calibration setup.
Figure 18:
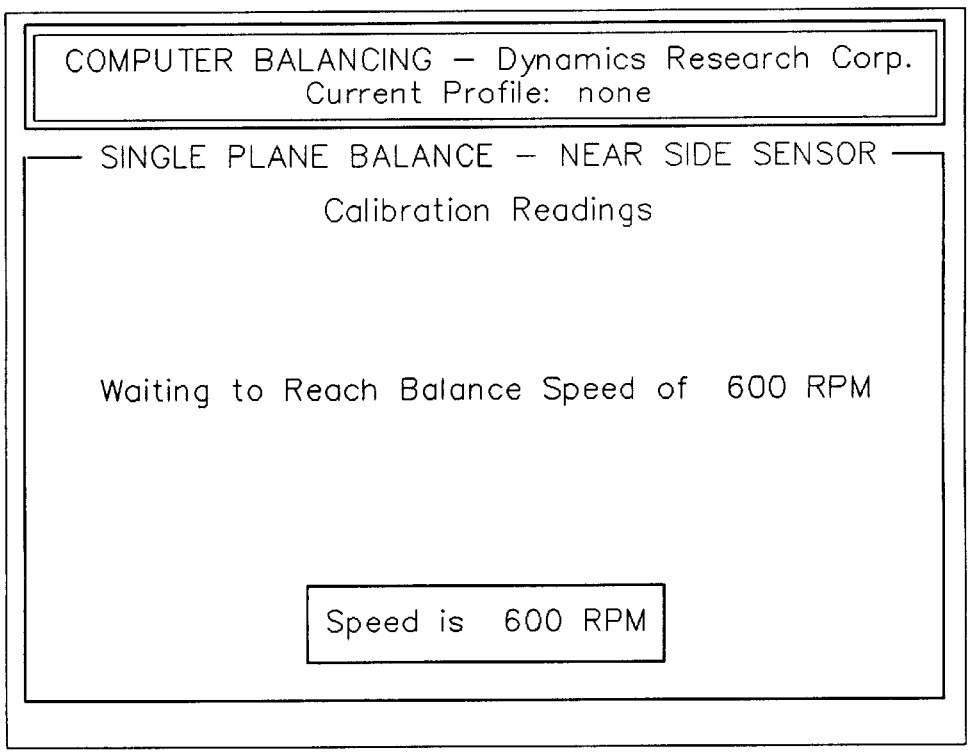
FIG. 18 is a facsimile of the notice provided to the operator that the program is waiting for the machine to reach balance speed.
Figure 17:
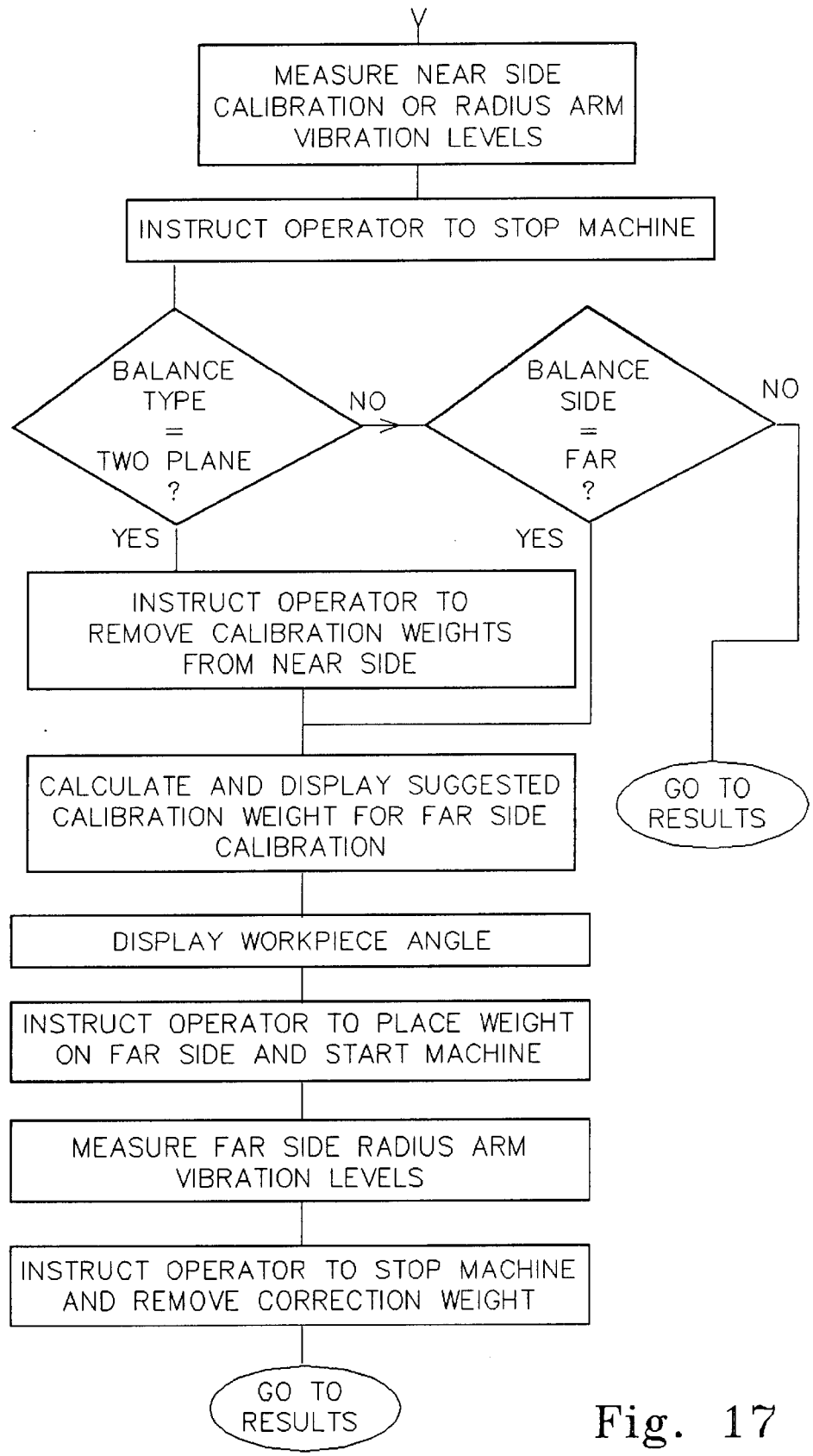
FIG. 17 is a logic flow diagram illustrating the program sequences required to measure the work piece vibration levels.
Figure 19:
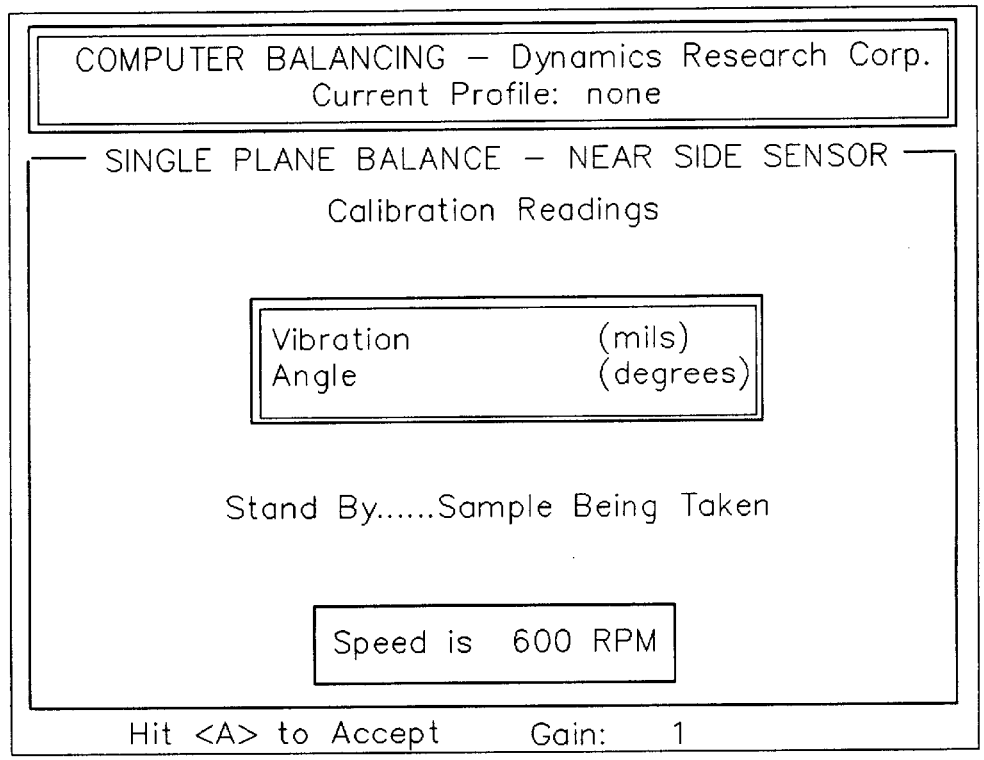
FIG. 19 is a facsimile of the screen which advises the operator that balance speed has been reached and samples are being taken.
Figure 20:
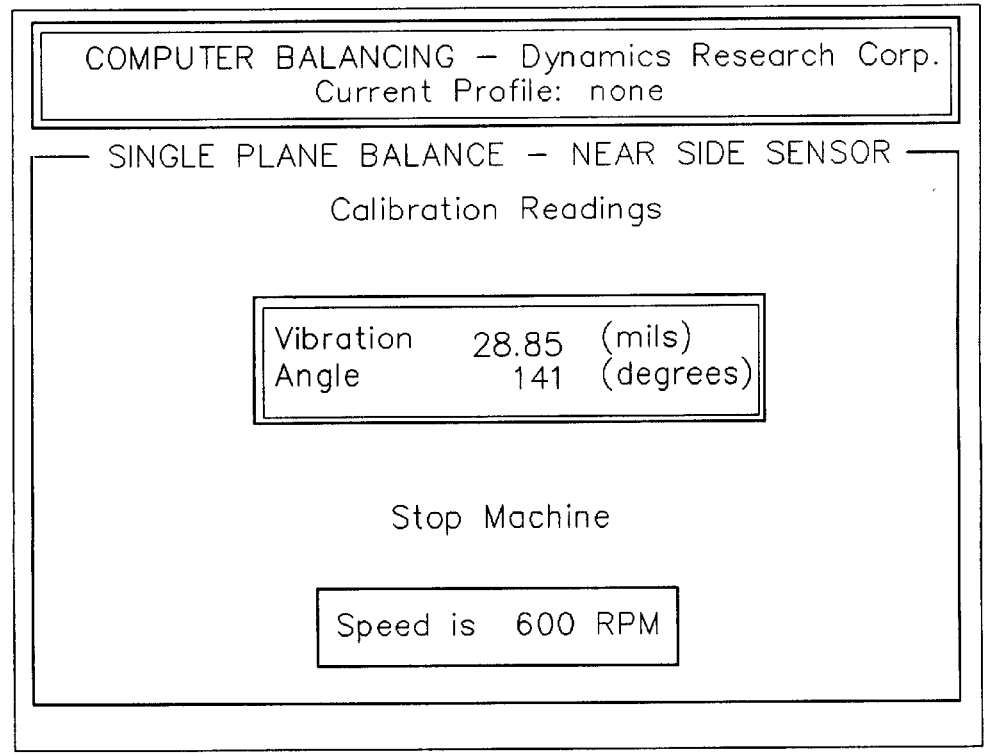
FIG. 20 is a facsimile of the screen advising the operator that samples have been taken, the results of the samples and instructing the operator to stop the machine.

When the calibration setup is acknowledged by striking the "Y" key as directed in FIG. 16, the program advances to the routines of FIG. 17. The flashing message of FIG. 18 advises the operator that the system is waiting to reach the required balance speed once the balance speed is reached, the flashing message changes to the stand by message of FIG. 19 until the sample is taken. The operator is then instructed to stop the rotation, FIG. 20. When the machine is stopped, the operator follows the instructions of the next screen, FIG. 21, by removing the weights.

Figure 22A:
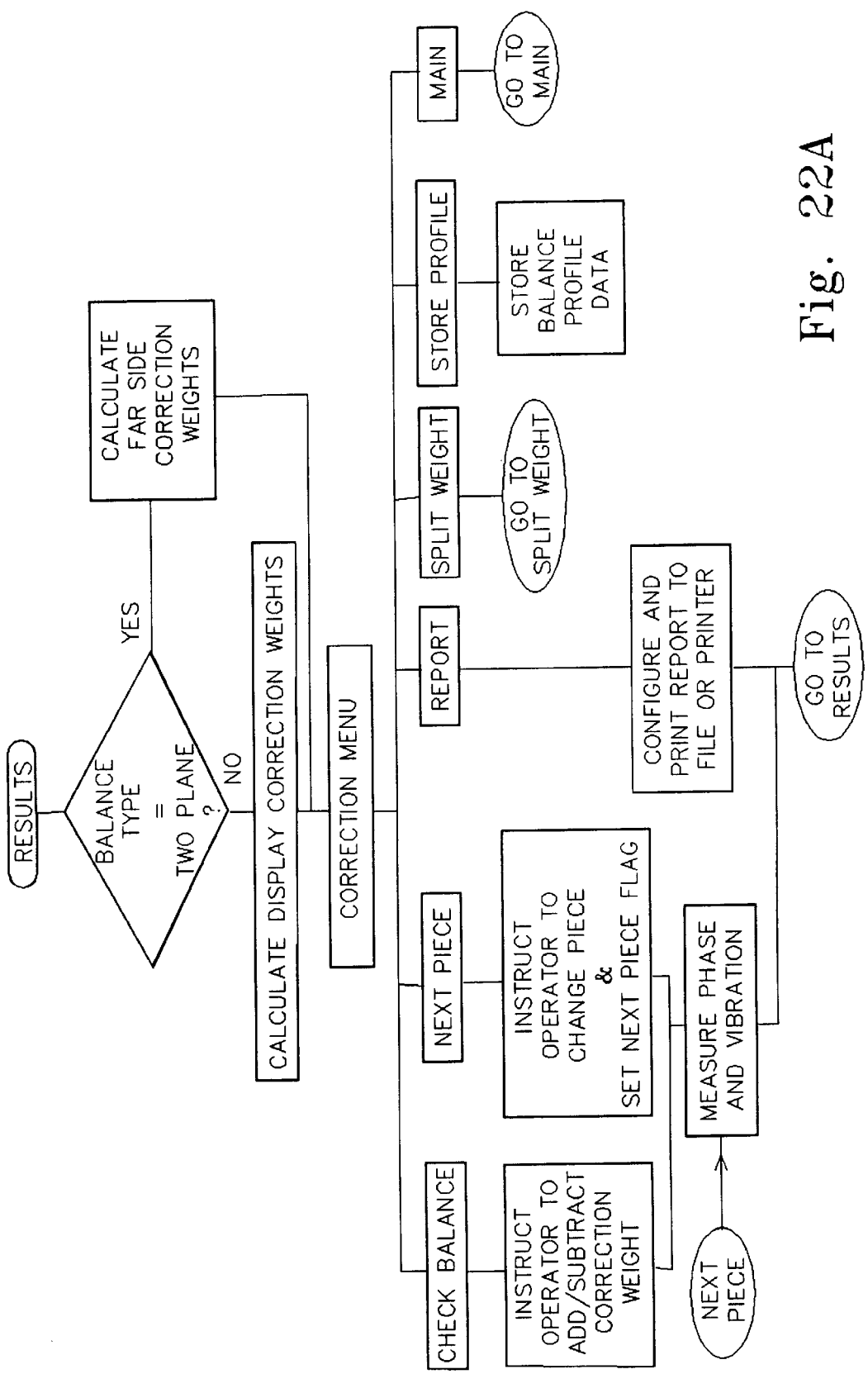
FIG. 22A is a logic flow diagram illustrating the routines required to calculate and display the correction weight values and branch the program to a selection of subroutines.
Figure 24:
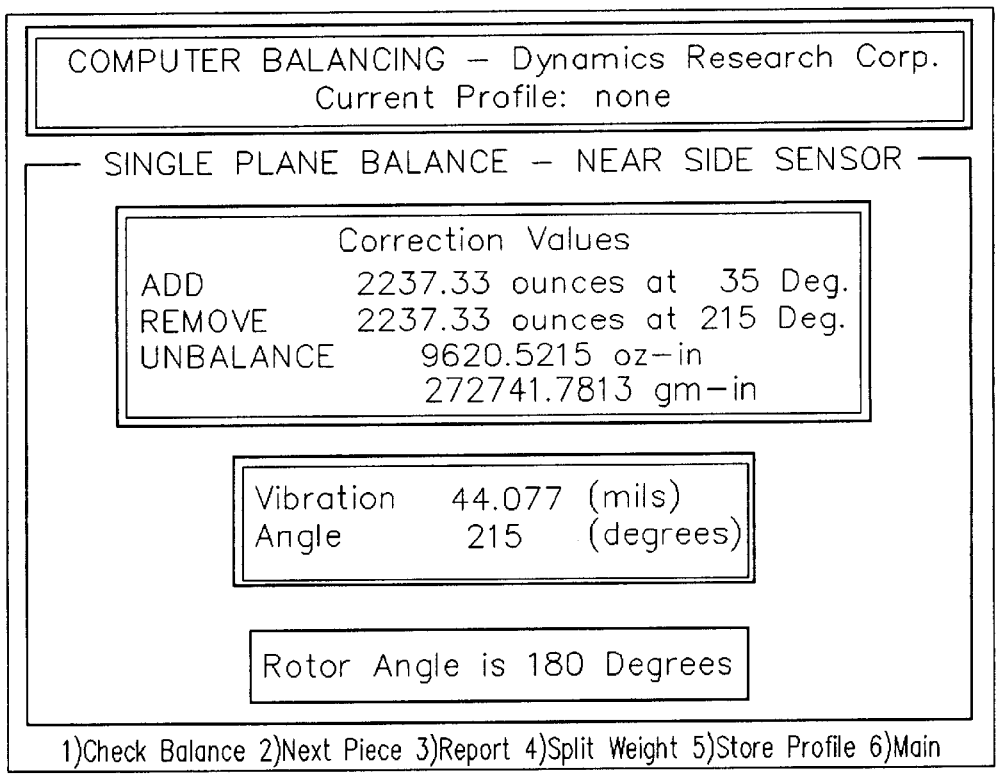
FIG. 24 is the final correction screen created by the logic illustrated in FIG. 22 presenting the correction values in terms of weight to be added or alternately removed and the location of the addition or removal and instructing the operator to select a branching subroutine.

After the test weight is removed, the operator strikes any key and the program calculates the required correction as indicated in FIG. 22. The results, the amount and location of the correction required to balance the work piece, are displayed in the screen illustrated by FIG. 23 if the drill depth option was selected on the display screen illustrated by FIG. 6A. In FIG. 23 a drill depth and drill location are provided. If an option other than drill depth was selected on the FIG. 6A screen, the correction values displayed at this point in the program are weight to be added at a location and the alternate correction of weight to be removed from a location as illustrated in FIG. 24. After making the corrections, the operator chooses the check balance option from the menu at the bottom of the screen and then starts the machine.

A number of options are listed at the bottom of the final screen. The first, 1) Check balance, is selected after the balance run. This causes the computer to take new readings to see if the balance was corrected to a reasonable tolerance or if additional balancing is required. The display flashes through the run messages previously discussed and returns to the display of FIG. 23 to indicate if additional correction is required.

When the proper balance condition is reached, 2) Next Piece may be selected from the bottom of the screen illustrated by FIG. 23 to balance the next identical part without weight calibration runs. If a report is desired the operator selects "3) Report" which will produces a menu for selecting: 1) Print Report; 2) Save Report; 3) Change Report Information; and 4) Return. If Print Report is selected, a report similar to FIG. 25 is produced. Selecting Save Report stores the data so the report can be printed at a later time. Change Report Information allows the operator to change job and operator data but not balance data. Return returns the last final screen, FIG. 23.

The other balance runs use similar screens with different identification displays, i.e., FAR SIDE SENSOR, TWO PLANE BALANCE, FORCE BALANCE, etc. When Two Plane Balancing is being preformed, duplication is required to accommodate calculations for both sides but the dual data is displayed on a common screen. Two Plane and Force Balancing is preformed in a manner similar to that described for Single Plane Balancing so a step-by-step presentation is not provided to avoid repletion.

In the manual mode the system provides information on the amount (Mils) of vibration and Phase Angle (Degrees), at the bearing planes, on each end of the work piece, in the manual mode of operation. It is possible to balance in this program using the old fashioned "Vector Method" of balancing. This data, which is free from computer manipulation, is also used for studying the dynamics of a rotor in motion or for performing whip control balancing on long flexible rolls.

Figure 4:
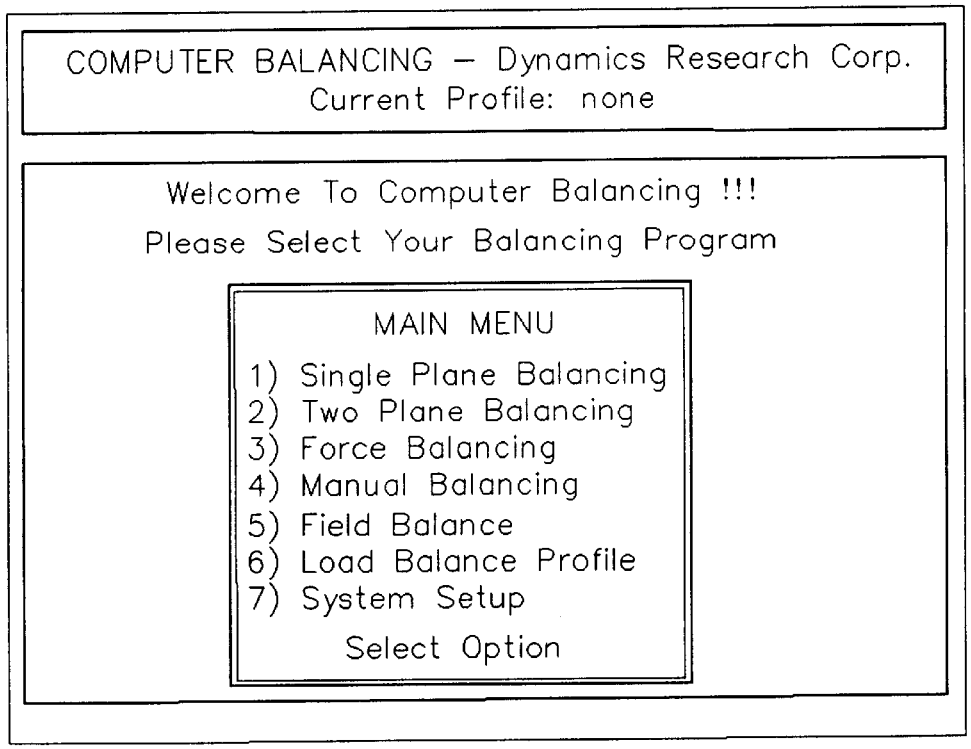
FIG. 4 illustrates the main menu screen for the menu driven balancing system.
Figure 6A:
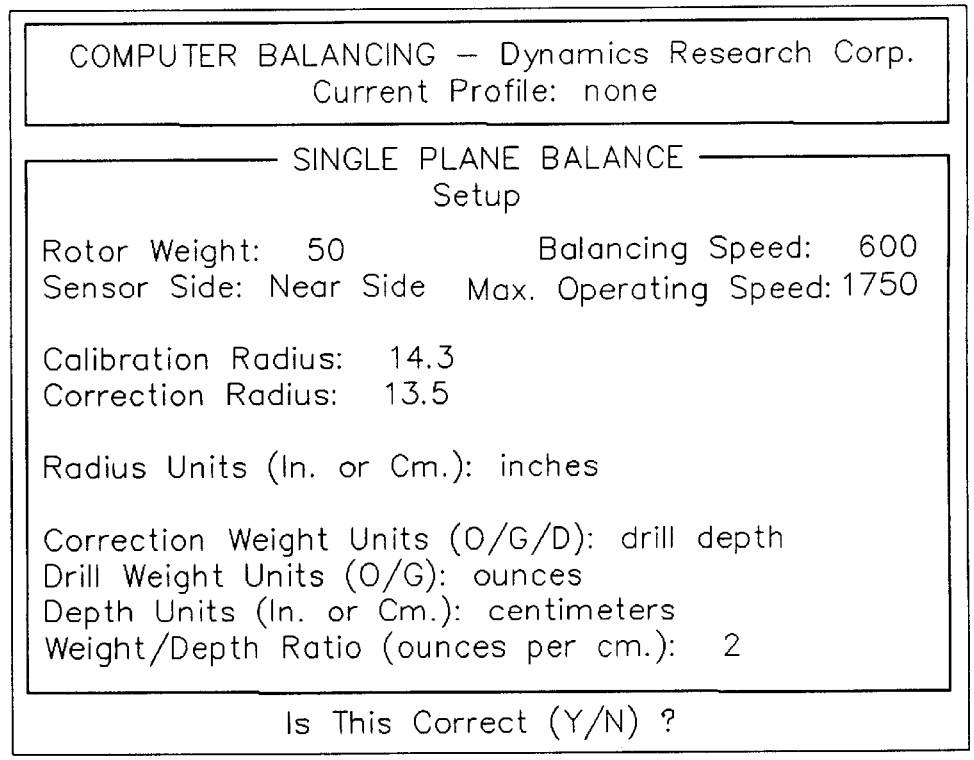
FIG. 6A illustrates the screen containing the menu driven sequences required to setup for Single Plane Balancing.
Figure 26:
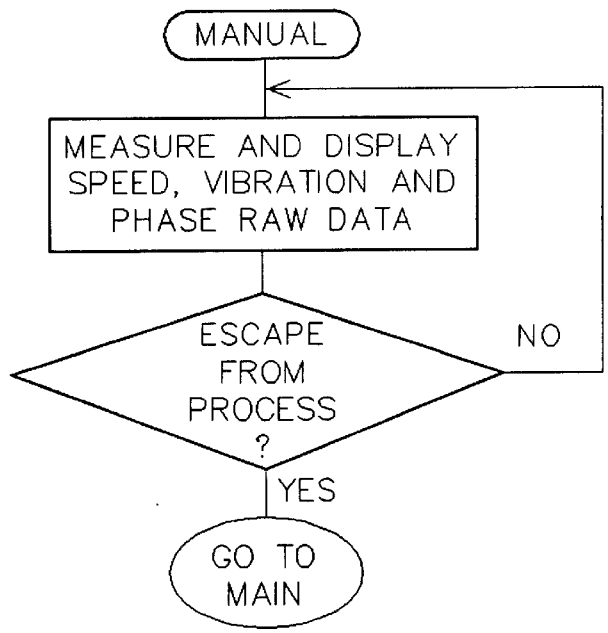
FIG. 26 is a logic flow diagram of the program steps involved in manual balancing.
Figure 27:
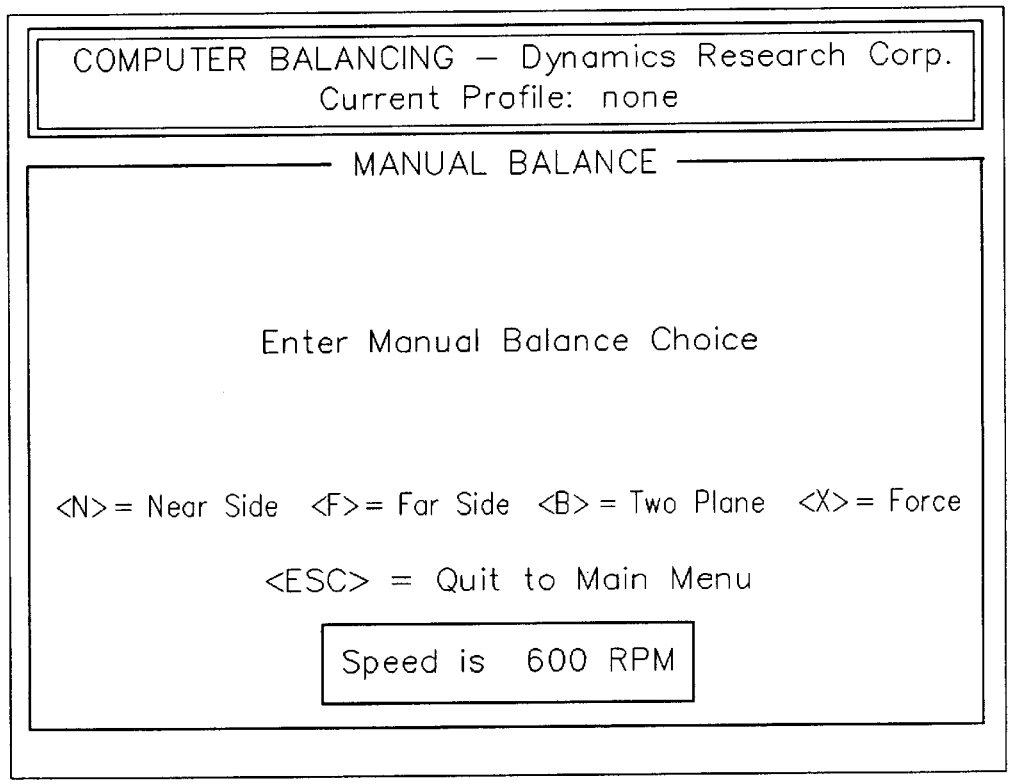
FIG. 27 is a facsimile of the manual Balance selection screen which allows the operator to choose the type of manual Balancing to be performed.
Figure 28:
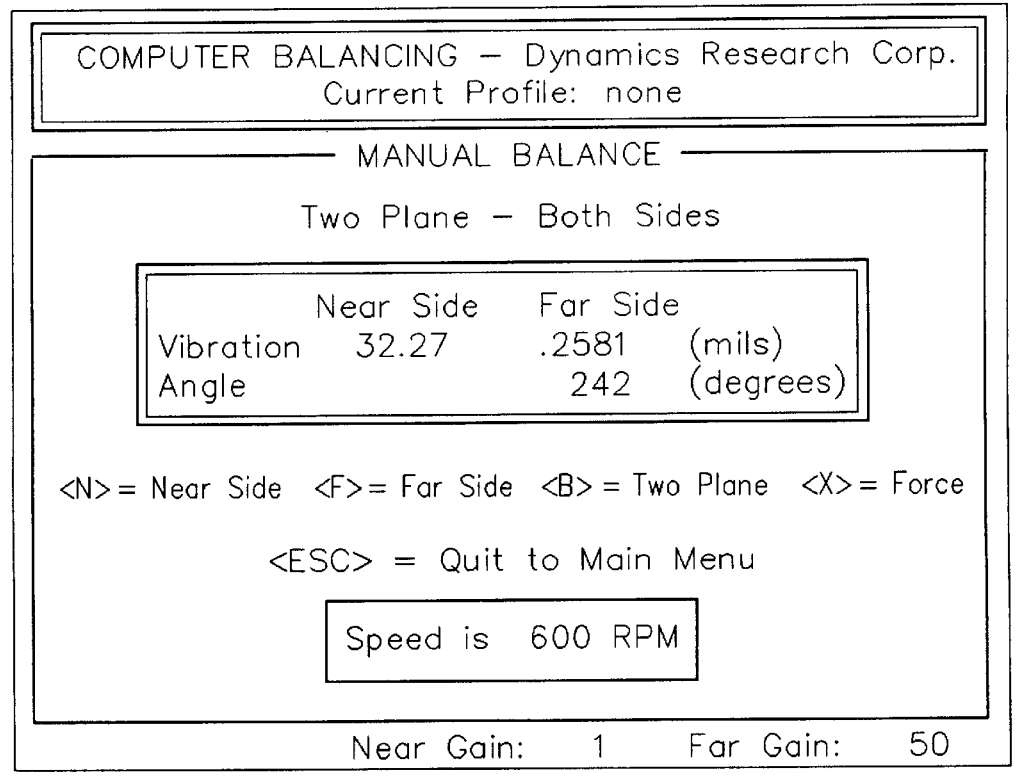
FIG. 28 illustrates the screen presentation advising the operator of the vibration and critical angle of the work piece during manual Balancing.

If manual Balancing is selected when the main menu of FIG. 4 is displayed, the system goes to the manual Balance routine of FIG. 3 which moves the program into the manual mode illustrated by FIG. 26. In this mode, a screen, FIG. 27, directs the user to select: Near Side, Far Side, Two Plane or Force. When a selection is made, vibration in mils and angle in degrees is presented on the CRT. The same information is presented in this screen for near or far side or Force but the display distinguishes which side is selected. When Two Plane is selected, both near and far side vibration and angle information is presented, see FIG. 28. Note that the gain used in each side computation is listed on the bottom of the screen.

Figure 29:
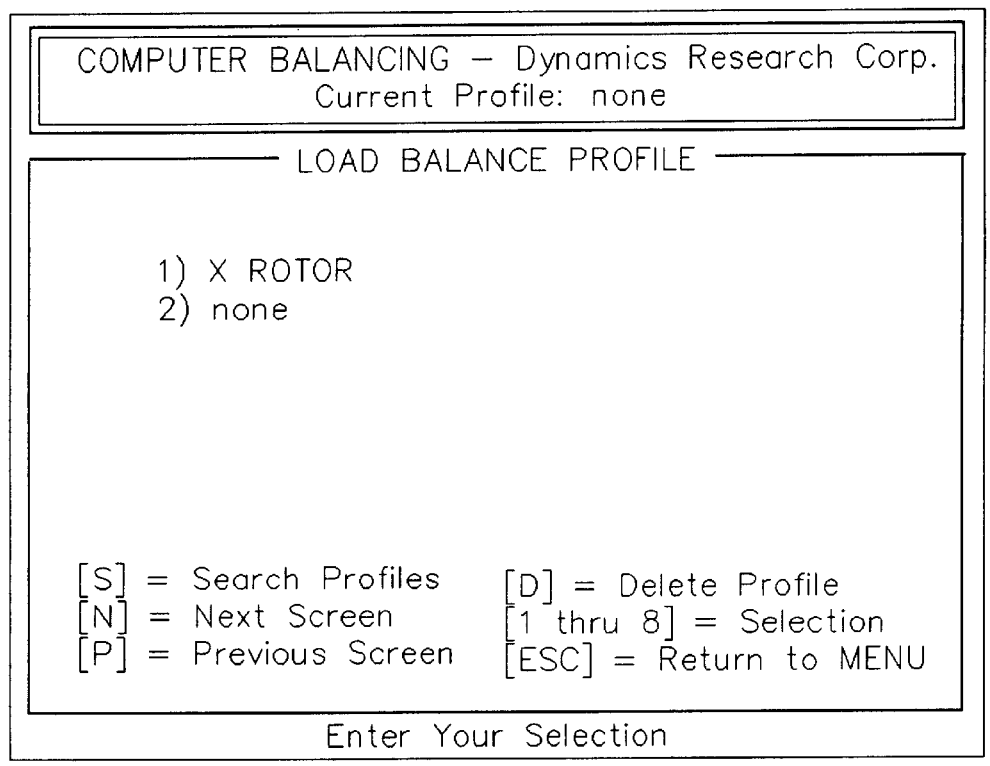
FIG. 29 is the Load Balance Profile display provided when an operator elects to use stored balanced data.
Figure 30:
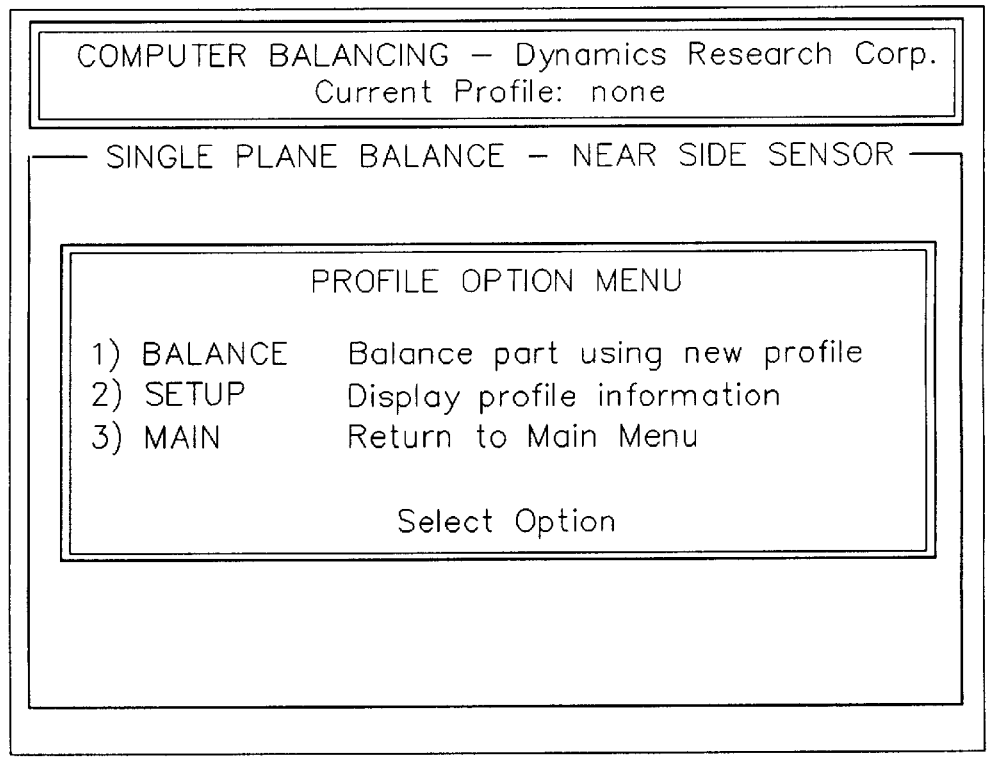
FIG. 30 is the operator options displayed after a balance profile has been selected for use.

When Load Balance Profile is selected on the Main Menu, load profile data is accessed and the Load Balance Profile option list menu, FIG. 29, is displayed. When a menu option is selected, the profile menu option screen, FIG. 30, is presented, allowing an operator to balance the work piece based on the stored data. If option 1) BALANCE is selected, the program jumps to the routines of FIG. 22 and the displays of FIGS. 18, 19 and 20 flash on the screen to be followed by the correction values display, FIGS. 23 or 24.

The system setup routine entered through the main menu of FIG. 4 enables the user to setup a user name and address to be automatically printed on output reports; the machine model and serial number; the system and data file paths; a system password to ensure security; and set hardware calibration values.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What is claimed is:

1. A dynamic balancing apparatus of the class which includes a motor for rotating a work piece to be balanced, comprising:

means for producing a plurality of pulses for each revolution of said motor;

means responsive to said pulses for determining increments of angular displacement of said work piece relative to a reference point on said work piece;

means for determining when said work piece is rotating at a constant angular velocity; and means for determining the optimum placement of a corrective mass adjustment on said work piece in said increments of angular displacement from said reference point based on the generation of said pulses while said work piece is rotating at said constant angular velocity.

2. A balancing apparatus as defined in claim 1, wherein said means for producing said pulses for each revolution of said motor includes an incremental encoder selected from the group of incremental encoders including mechanical, magnetic and optical transducers.

3. A balancing apparatus as defined in claim 2, wherein said incremental encoder is an optical means for producing said pulses for each revolution of said motor.

4. A balancing apparatus as defined in claim 2, wherein said means responsive to said pulses for determining increments of angular displacement of said work piece relative to a reference point on said work piece comprises a counter for accumulating said pulses and a means for resetting said counter.

5. A balancing apparatus as defined in claim 4, wherein said means for resetting said counter comprises an optical sensor for detecting said reference point.

6. A balancing apparatus as defined in claim 5, including a work piece vibration responsive transducer and a filter for the output of said work piece vibration responsive transducer synchronized to the work piece angular velocity, wherein said means for determining the optimum placement of a corrective mass adjustment on said work piece in said increments of angular displacement from said reference point comprises a means to store the value of the count accumulated in said counter in response to an output function of said filter.

7. A dynamic balancing apparatus of the class which includes a motor for rotating a work piece to be balanced, a work piece vibration responsive transducer and a filter for the output of said work piece vibration responsive transducer synchronized to the work piece angular velocity, comprising:

means for producing a train of pulses for each revolution of said motor;

a counter for accumulating said equally spaced pulses;

a reference point on said work piece;

a sensor for detecting said reference point on said work piece for resetting said counter and for determining when said work piece is rotating at a constant angular velocity;

means responsive to said train of pulses and said reference point for determining increments of angular displacement of said work piece relative to said reference point; and means to interpret the value of the count accumulated in said counter after said motor stops rotating said work piece and while said work piece is rotating as the result of inertia in response to an output function of said filter produced while said work piece was rotating at said constant angular velocity for determining the optimum placement of a corrective mass adjustment on said work piece in said increments of angular displacement from said reference point.

8. A method of balancing a work piece, including the steps of:

energizing a motor;

coupling the rotational force of said motor to said work piece whereby said work piece is rotated;

monitoring the angular velocity of said work piece with an optical sensor responsive to a reference mark on said work piece;

generating a balance speed signal when said step of monitoring the angular velocity of said work piece indicates a constant angular velocity for a predetermined time period;

monitoring the passage of said reference mark on said work piece and producing a reset signal in response thereto;

generating a train of pulses for each revolution of said motor;

accumulating individual pulses comprising said train of pulses in a counter means when said step of monitoring the passage of said reference mark indicates reference mark passage after said balance speed signal has been generated;

reading the accumulated pulse count after each reference mark passage;

determining the number of said individual pulses accumulated for one complete revolution of the work piece;

determining the number of said individual pulses representing an increment of angular displacement of the work piece from the number of said individual pulses accumulated for one revolution; and determining the position of weight adjustment required for balancing based on rotation of said work piece.

9. A method of acquiring and synchronizing angular displacement of a work piece relative to a reference point, including the steps of:

1) energizing a motor;

2) coupling the rotational force of said motor to said work piece whereby said work piece is rotated;

3) monitoring the passage of a reference mark moving in association with said work piece and producing a reset signal in response to each passage of said reference mark;

4) generating a plurality of pulses for each revolution of said motor with an encoder driven by said motor;

5) accumulating said pulses in a counter;

6) reading the accumulated pulse count in said counter in response to each occurrence of said reset signal;

7) resetting said counter in response to each occurrence of said reset signal after said accumulated pulse count reading;

8) determining the number of said pulses representing an increment of angular displacement of said work piece from the number of said pulses accumulated for one revolution of said work piece;

9) determining the position of weight adjustment required for balancing based on the magnitude of vibration of said work piece during rotation;

10) verifying motor deenergization by determining if the motor angular velocity is reducing;

11) resetting said counter and beginning to accumulate said pulses in said counter when said step of monitoring the passage of a reference mark indicates reference mark passage after said motor deenergization has been verified;

12) monitoring a fiber optic sensor output for a zero crossing signal and storing the accumulated value of said counter means upon detection of said zero crossing signal if another reference mark passage has not been detected since the beginning of the present step;

13) upon sensing the next reference mark passage, resetting said counter means and beginning to accumulate said individual pulses of said train of pulses in said counter means and repeating the previous step of resetting said counter means and beginning to accumulate said pulses in said counter means until a predetermined number of stored accumulated counter values have been obtained;

14) determining if the stored accumulated counter values are equal;

15) if the stored accumulated counter values are equal, accepting their averaged value as the angular displacement from the reference mark for weight adjustment and converting the count to units of the previously determined increment of angular displacement of the work piece; and 16) if the stored accumulated counter values are not equal, repeating the sequence of steps beginning with step 13.

10. A dynamic balancing system of the class which includes a motor for rotating a work piece to be balanced, comprising:

means for producing a pulse train for each revolution of said motor;

means responsive to pulses comprising said pulse train for determining increments of angular displacement of said work piece relative to a reference point on said work piece;

means for determining when said work piece is rotating at a constant angular velocity; and means for displaying the optimum placement of a corrective mass adjustment on said work piece as determined while said work piece was rotating at said constant angular velocity in said increments of angular displacement from said reference point based on the generation of said pulse train after said motor is deenergized and while said work piece is manually rotated.

11. A balancing system as defined in claim 10, wherein said means for producing a pulse train for each revolution of said motor includes an incremental encoder selected from a group of incremental encoders including mechanical, magnetic and optical transducers.

12. A balancing system as defined in claim 11, wherein said incremental encoder is an optical means for producing said pulse train for each revolution of said motor.

13. A balancing system as defined in claim 11, wherein said means responsive to said pulse train for determining increments of angular displacement of said work piece relative to a reference point on said work piece comprises a counter for accumulating said equally spaced pulses and a means for resetting said counter.

14. A balancing system as defined in claim 13, wherein said means for resetting said counter comprises an optical sensor for detecting said reference point.

15. A balancing system as defined in claim 14, including a work piece vibration responsive transducer and a filter for the output of said work piece vebration responsive transducer synchronized to the work piece angular velocity, wherein said means for displaying the optimum placement of a corrective mass adjustment on said work piece in said increments of angular displacement from said reference point comprises a means to store the value of the count accumulated in said counter in response to an output function of said filter.

16. A dynamic balancing apparatus of the class which includes a motor for rotating a work piece to be balanced, a work piece vibration responsive transducer and a filter for the output of said work piece vibration responsive transducer synchronized to the work piece angular velocity, comprising:

an optical means for producing a train of pulses for each revolution of said motor;

a counter for accumulating said pulses;

a reference point on said work piece;

means for determining when said work piece is rotating at a constant angular velocity;

an optical sensor for detecting said reference point on said work piece for resetting said counter when said work piece is manually rotated past said optical sensor;

means responsive to said pulses and said reference point for determining increments of angular displacement of said work piece relative to said reference point; and means to interpret the value of the count accumulated in said counter in response to an output function of said filter determined while said work piece was rotating at said constant angular velocity for determining the optimum placement of a corrective mass adjustment on said work piece in said increments of angular displacement from said reference point.

17. A method of balancing a work piece, including the steps of:

1) energizing a motor;

2) coupling the rotational force of said motor to said work piece whereby said work piece is rotated; monitoring the angular velocity of said work piece with an incremental encoder which produces a train of pulses;

3) generating a balance speed signal when said step of monitoring the angular velocity of said work piece indicates a constant angular velocity for a predetermined time period;

4) monitoring the passage of a reference mark on said work piece;

5) accumulating the individual pulses of said train of pulses in a counter means when said step of monitoring the passage of a reference mark indicates reference mark passage after said balance speed signal has been generated;

6) reading the accumulated pulse count after each reference mark passage;

7) determining a number of pulses accumulated for one complete revolution of the work piece from the accumulated pulse count readings;

8) deenergizing said motor:

9) manually rotating said work piece when said work piece's inertia fails to rotate said work piece an angular distance required for pulse counter/work piece synchronization; and 10) displaying the position of mass adjustment required for balancing based on synchronization derived by said manual rotation of said work piece.

18. A method of balancing a work piece, including the steps of:

1) energizing a motor;
2) coupling the rotational force of said motor to said work piece whereby said work piece is rotated;
3) monitoring the angular velocity of said work piece using an incremental encoder which produces a train of pulses;
4) generating a balance speed signal when step 3) indicates a constant angular velocity for a predetermined time period;
5) monitoring the passage of a reference mark on said work piece;
6) accumulating the individual pulses of said train of pulses in a counter when step 5) indicates reference mark passage after said balance speed signal has been generated;
7) reading the accumulated pulse count after each reference mark passage;
8) determining a number of pulses accumulated for one complete revolution of the work piece from the accumulated pulse count readings;
9) determining mass adjustment value and position in response to said balance speed signal;
10) deenergizing said motor;
11) verifying motor deenergization by determining if the motor angular velocity is reducing;
12) advancing to step 13) if motor is deenergized;
13) resetting said counter means and beginning to accumulate the individual pulses of said train of pulses in said counter means when said step of monitoring the passage of a reference mark indicates reference mark passage after said motor deenergization has been verified;
14) monitoring a vibration responsive transducer filter output for a zero crossing signal and storing the accumulated value of said counter means upon detection of said zero crossing signal if another reference mark passage has not been detected since the beginning of the present step;
15) upon sensing the next reference mark passage, repeating step 13), until a predetermined number of stored accumulated counter values have been obtained;
16) determining if the stored accumulated counter values are equal;
17) if the stored accumulated counter values are equal, accepting their averaged value as the angular displacement from the reference mark for mass adjustment and converting the count to angular displacement of the work piece; and
18) if the stored accumulated counter values are not equal, repeating the sequence of steps beginning with step 13) of beginning mass adjustment angular position determination;
19) manually rotating said work piece when the apparatus inertia fails to rotate said work piece an angular distance required for pulse counter/work piece synchronization as indicated by successful completion of step 18); and
20) displaying the position of mass adjustment required for balancing based on synchronization derived by said manual rotation of said work piece.

19. A method for dynamically balancing a work piece through the use of a motor for rotating the work piece, work piece vibration responsive transducers and a computer, including the steps of:

1) placing a reference point on the work piece;
2) rotating the work piece by activating the motor;
3) determining when said work piece has achieved a constant angular velocity;
4) producing a train of pulses for each revolution of the motor;
5) incrementing a counter in response to pulses comprising said train of pulses;
6) detecting the reference point;
7) resetting the counter whenever the reference point is detected;
8) determining the number of pulses per increment of angular displacement of the work piece as a function of the accumulated number of pulses between reset events of the counter;
9) deenergizing the motor;
10) while the work piece is rotating due to the inertia of the moving components of the system, determining the optimum corrective mass and placement adjustment for the work piece in response to output functions of the vibration responsive transducers determined while said work piece was rotating at said constant angular velocity and the accumulated number of pulses in the counter; and
11) determining angular displacement of the work piece relative to the reference point as a function of the accumulated number of pulses in the counter.

20. A dynamic balancing apparatus of the class which includes a motor for rotating a work piece to be balanced, comprising:

means for producing a train of pulses for each revolution of said motor;
means responsive to said train of pulses for determining increments of angular displacement of said work piece relative to a reference point on said work piece; and
means for determining the optimum placement of a corrective mass adjustment on said work piece in said increments of angular displacement from said reference point based on the generation of said train of pulses while said work piece and said motor are rotating due to their inertia while said motor is deenergized.

* * * * *